United States Patent
Hobson et al.

(10) Patent No.: US 10,035,214 B2
(45) Date of Patent: Jul. 31, 2018

(54) STUD WELDING GUN AND MAGAZINE

(71) Applicant: IMAGE INDUSTRIES, INC., Huntley, IL (US)

(72) Inventors: Blake Hobson, Lakewood, IL (US); Daniel R. Somen, Chicago, IL (US); Evan P. Thompson, Oak Park, IL (US); Philip M. Anthony, III, Chicago, IL (US)

(73) Assignee: IMAGE INDUSTRIES, INC., Huntley, IL (US)

( * ) Notice: Subject to any disclaimer, the term of this patent is extended or adjusted under 35 U.S.C. 154(b) by 1121 days.

(21) Appl. No.: 14/272,052

(22) Filed: May 7, 2014

(65) Prior Publication Data
US 2015/0321281 A1  Nov. 12, 2015

(51) Int. Cl.
  *B23K 11/04* (2006.01)
  *B23K 9/20* (2006.01)
  *B23K 9/00* (2006.01)

(52) U.S. Cl.
  CPC .................................... *B23K 9/206* (2013.01)

(58) Field of Classification Search
  CPC .......... B23K 9/206; B23K 9/202; B23K 9/20; B23K 9/207; B23K 11/04; B23K 20/1295; B23K 11/0053
  USPC .......... 219/98–99; 221/312 A, 312 B, 312 C
  See application file for complete search history.

(56) References Cited

U.S. PATENT DOCUMENTS

2012/0233821 A1\*  9/2012  Hobson .................. B23K 9/202
                                                    24/571

\* cited by examiner

*Primary Examiner* — Michael G Hoang
(74) *Attorney, Agent, or Firm* — McAndrews, Held & Malloy, Ltd.

(57) ABSTRACT

A tool configured to dispense consumables, such as a plurality of stackable weld clips. The tool may receive the insertion of a magazine, which may include the weld clips, a pusher, and a retention pin positioned on a cartridge skewer. The magazine may be inserted into a magazine holder assembly to provide a magazine assembly. The magazine holder assembly may include one or more movable and stationary racks that engage the pusher. The rearward lateral displacement of a spindle may displace the movable rack and electrode arms, while opening retention arms. The electrode arms, which may include clip back-up arms, may be positioned to provide a clamping force on a weld clip that is being dispensed. The forward displacement of the spindle may displace the clamped welding clip with the electrode arms, pivotally open a pawl mechanism, move the retention arms to a closed position, are result in the indexing of weld clips in the magazine assembly.

17 Claims, 25 Drawing Sheets

STUD WELDING GUN AND MAGAZINE

BACKGROUND OF THE INVENTION

Embodiments of the present invention relate to a delivery device or tool and associated magazine containing stackable, disposable consumables. More specifically, certain embodiments of the present invention relate to a stud welding gun used in the delivery of weld clips that may be stacked together in a magazine that may be inserted into or otherwise be operably connected to the stud welding gun. The weld clips may be individually dispensed from the magazine and be position for welding by the stud welding gun at target location on a work piece.

Various types of machinery employ mounts that are used to route and/or secure wires, cables, tubes, flexible pipe, hoses, and the like (collectively cables) in or around the machinery, including, for example, stationary equipment, construction equipment and service vehicles, among other machinery and equipment. In use, the cables may be secured to one or more mounts that are affixed to pieces or components of the machinery. Securing cables to such mounts, either directly or through the use cable ties, among other connectors, may prevent the cables from moving or extending into locations that may interfere with the operation of machinery, and/or to protect the cables being entangled and/or pulled on by other machinery or people.

One type of mount used for construction equipment is a relatively thick, oval shaped or open-ended mount. Such wires, which, for example, may have a diameter of approximately 3/16 inch, are often carried by workers, such as in bags, and are manipulated into position prior to being mounted to a work piece, such as, for example, a portion or component of the machinery. When being mounted to the work piece, the worker typically uses a hand to hold the oval-shaped or open-ended mount at a desired location on the work piece while using his/her other hand to weld the mount to the work piece, such as, for example, by operating a welding torch. Further such mounts may require two or more welds, such as a weld to secure the oval or open-ended shape of the manipulated wire and one or more welds to secure the mount to the work piece.

However, this procedure of requiring the worker to retrieve the desired mount, holding the mount with one hand at or around a desired location on the work piece, and using the other hand to secure the mount to the work piece presents a number of issues. For example, such mounts are often relatively small in size. Therefore, the worker's hand that is holding the mount at the desired welded location on the work piece is typically in relative close proximity to the welding site. Such close proximity to the welding site may create the potential for burn injuries to the worker, such as burns caused by the heat or sparks generated during welding. Additionally, the close proximity of at least the worker's hand to the welding site may put the worker at risk of being injured through inadvertent contact with the welding gun, wire, or stick. Further, using both hands to secure and weld the mount to the work piece may cause the worker's head to be relatively close to the welding site, which may heighten the worker's possible exposure to harmful gases and fumes that are produced during welding. Additionally, the above process, or variations thereof, may be relatively time consuming, and thus increase production costs.

BRIEF SUMMARY OF THE INVENTION

An aspect of the invention is a magazine that includes a cartridge skewer having at least one arm. The magazine also includes a pusher that has at least one opening configured to receive the insertion of the at least one arm of the cartridge skewer. The magazine also includes a plurality of weld clips, each of the plurality of weld clips having a base portion and at least one winged portion. The at least one winged portion includes a window configured to receive the insertion of the at least one arm of the cartridge skewer. Further, the plurality of weld clips is configured to form a clip stack on the cartridge skewer.

Another aspect of the invention is a magazine that includes a cartridge skewer having a first arm and a second arm. The magazine includes a pusher having a first opening and a second opening, the first and second openings being configured to receive the insertion of the first and second arms, respectively, of the cartridge skewer. The magazine also includes a plurality of weld clips. Each of the plurality of weld clips has a base portion, a first winged portion, and a second winged portion. The first winged portion has a first window that is configured to receive the insertion of the first arm. Additionally, the second winged portion has a second window configured to receive the insertion of the second arm. The plurality of weld clips is configured to be stacked together to form a clip stack.

Additionally, a further aspect of the invention is a magazine that includes a cartridge skewer having a first arm and a second arm, a pusher, a plurality of weld clips, and a retention pin. The pusher includes a pusher body, a first opening, a second opening, and a plurality of pusher arms. The first opening is configured to receive the slideable insertion of the first arm of the cartridge skewer, while the second opening configured to receive the slideable insertion of the second arm of the cartridge skewer. Additionally, the plurality of pusher arms is configured to protrude from at least a portion of the pusher body of the pusher. Further, each of the plurality of weld clips has a base portion, a first winged portion, and a second winged portion. The first winged portion is separated from the base portion by an obtuse angle. The first and second winged portions have windows that are configured to receive the slideable insertion of the first and second arms, respectively, of the cartridge skewer. The plurality of weld clips are also configured to be stacked together to form a clip stack against the pusher when the plurality of weld clips and pusher are positioned on the cartridge skewer. Additionally, the retention pin is configured to retain the clip stack on the cartridge skewer.

Figure 1:
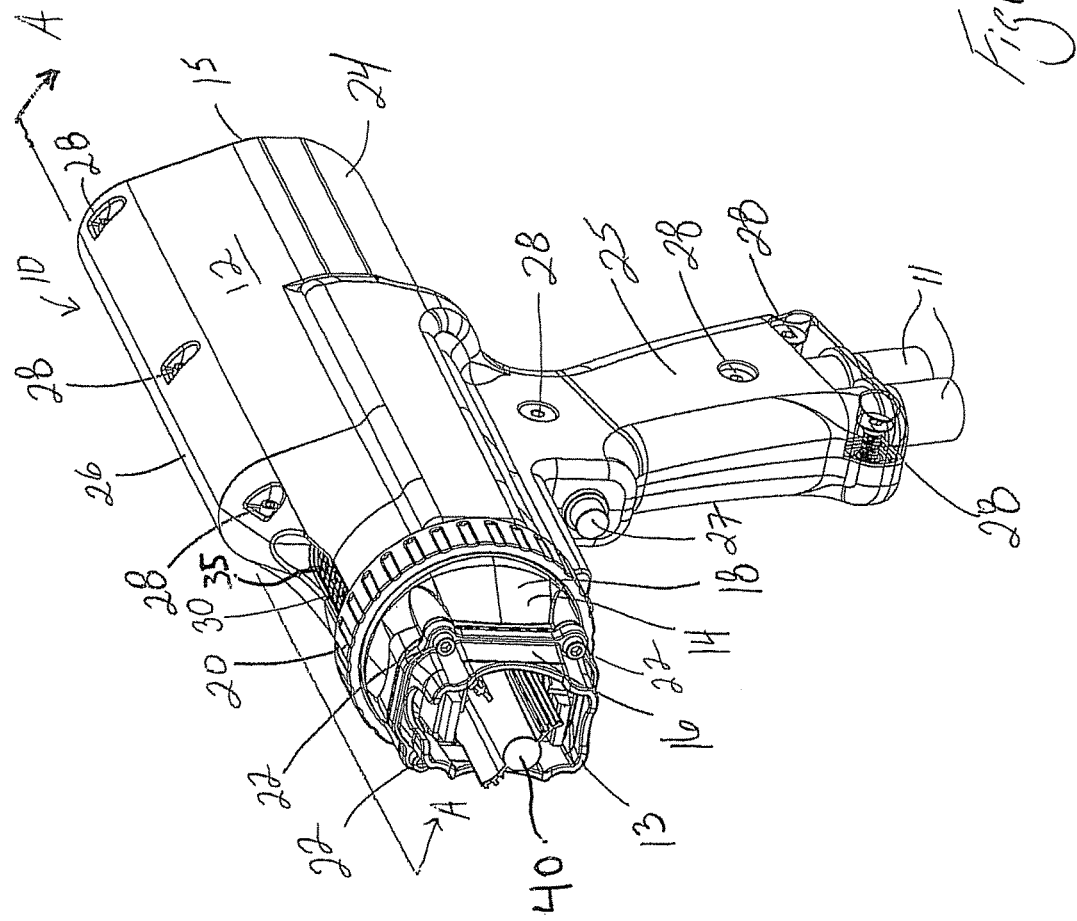
FIG. 1 illustrates a perspective side view of a tool.
Figure 2:
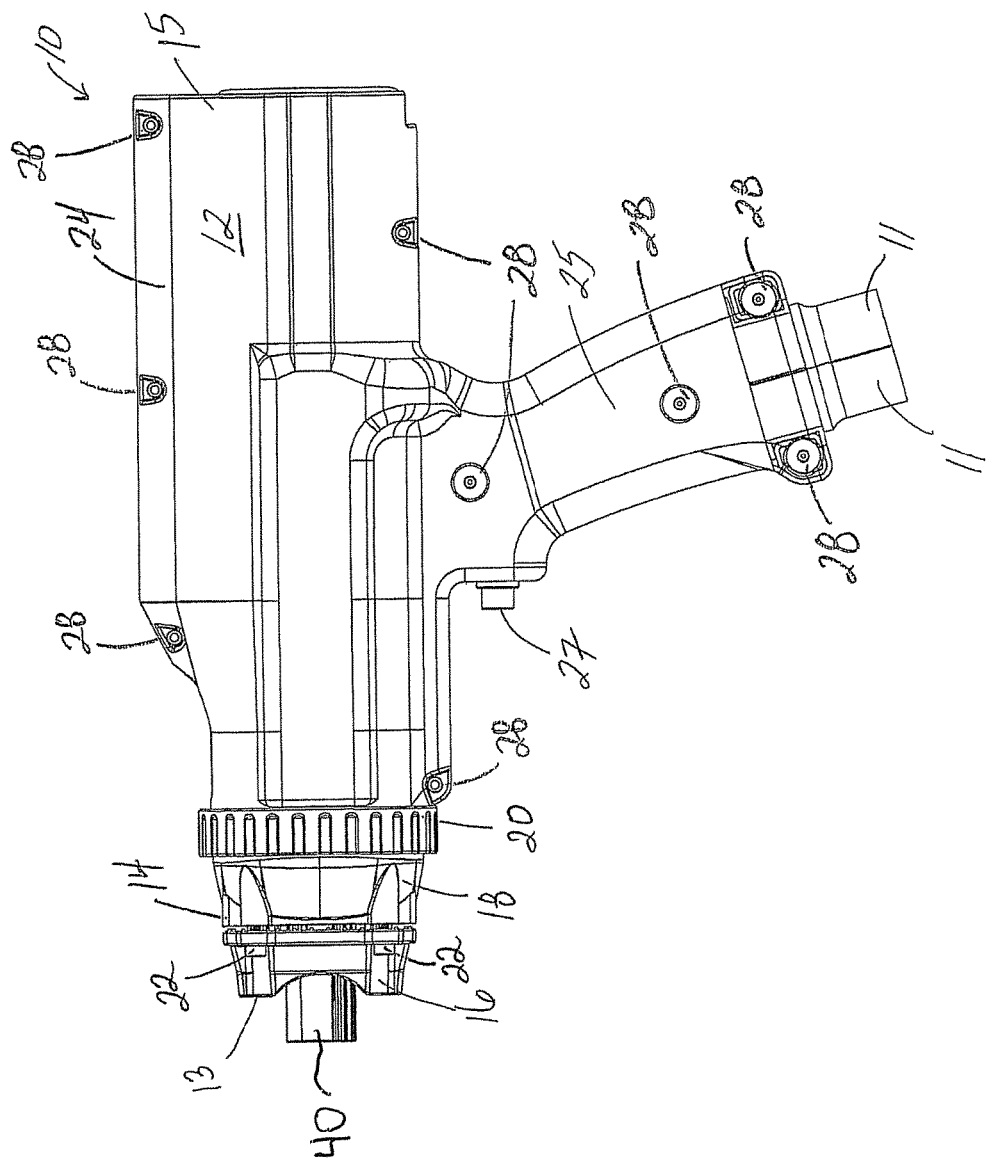
FIGS. 2 and 3 illustrate first and second side views, respectively, of the tool illustrated in FIG. 1.
Figure 3:
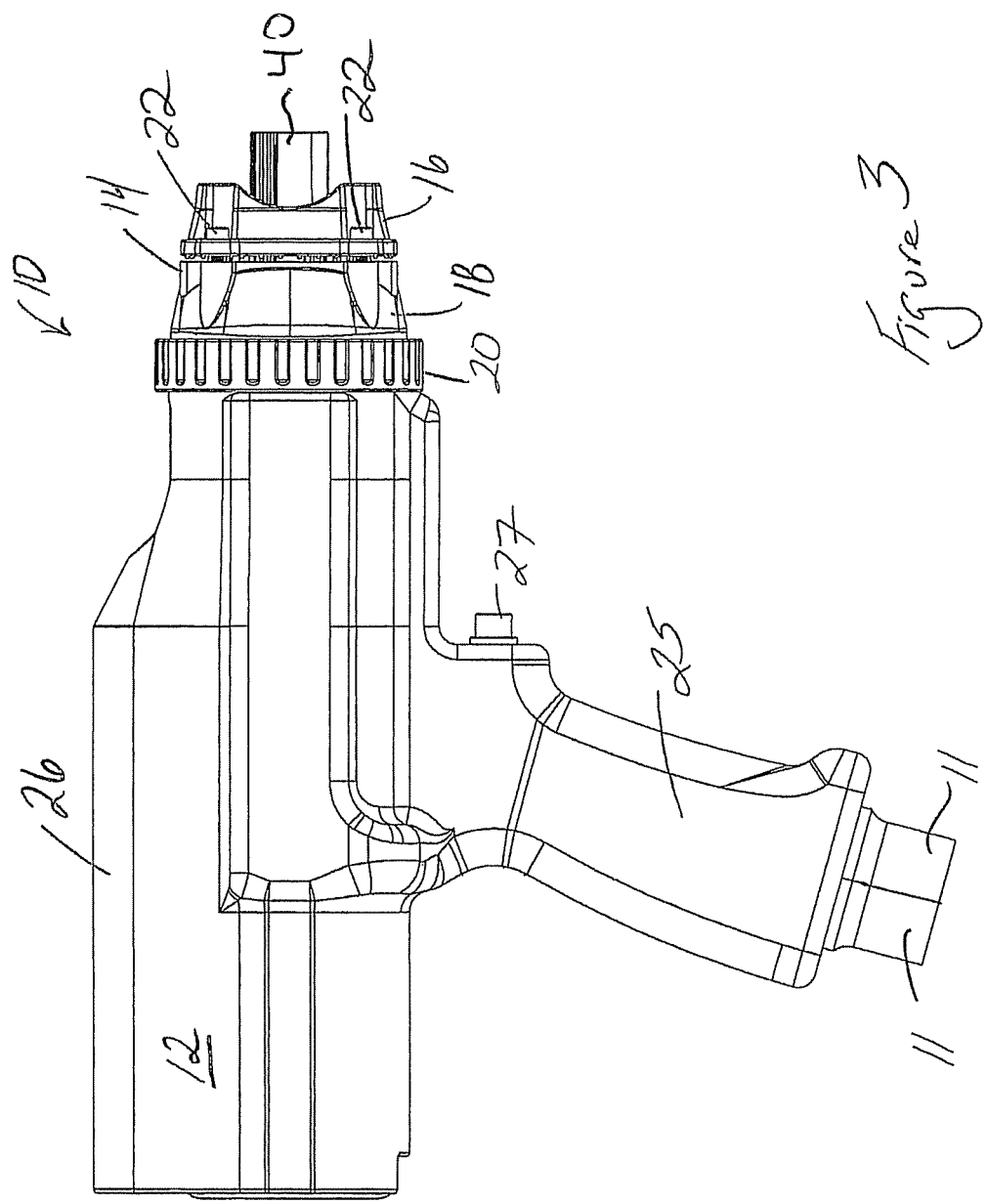

The following reference characters are used in the specification and figures:

| 10 | Tool |
| 11 | Cable |
| 12 | Housing |
| 13 | Front portion (of tool 10) |
| 14 | Shield assembly |
| 15 | Rear portion (of tool 10) |
| 16 | Front portion (of shield assembly 14) |
| 18 | Base portion (of shield assembly 14) |
| 20 | Retention collar (of tool 10) |
| 21 | Retention collar tightening ring (of housing 12) |
| 22 | Mechanical fasteners (of shield assembly 14) |
| 24 | First side (of housing 12) |
| 25 | Handle (of housing 12) |
| 26 | Second side (of housing 12) |
| 27 | Activator |
| 28 | Mechanical fasteners (of housing 12) |
| 30 | Window (of housing 12) |
| 31 | Orifice (of cartridge skewer 38) |
| 32 | Interior region |
| 34 | Magazine holder assembly |
| 35 | Cover (for window opening 30) |
| 36 | Weld clips |
| 37 | Skewer latching tab (of cartridge skewer 38) |
| 38 | Cartridge skewer |
| 39 | Pusher |
| 40 | Retention pin |
| 41 | Pusher body (of pusher 39) |
| 42 | Motor |
| 43 | Leading edge (of clip back-up arm 52) |
| 44 | Lead screw |
| 45 | Lead screw nut |
| 46 | Nut housing |
| 47 | Spring |
| 48 | Coupling |
| 49 | Spindle |
| 50 | Central axis |
| 51 | Position sensor |
| 52 | Clip back-up arm |
| 53 | Spring (of clip back-up arm 52) |
| 54 | Cable guide |
| 55 | Inlet (of cable guide 54) |
| 56 | Aperture (of spindle 49) |

-continued

| 57 | Outlet (of cable guide 54) |
| 58 | Aperture (of magazine holder assembly 34) |
| 59 | Spindle bearing |
| 60 | Electrode |
| 61 | Rib (of spindle bearing 59) |
| 62 | Weld clip sensor |
| 63 | Wall (of cable guide 54) |
| 64 | Magazine assembly |
| 65 | Backing surface (of clip back-up arms 52) |
| 66 | Arm (of cartridge skewer 38) |
| 68 | Back wall (of cartridge skewer 38) |
| 70 | Distal end (of cartridge skewer 38) |
| 72 | Proximal end (of cartridge skewer 38) |
| 74 | Base portion (of weld clip 36) |
| 76 | Winged portion (of weld clip 36) |
| 77 | Face wall (of weld clip 36) |
| 78 | Window (of weld clip 36) |
| 79 | Upper wall (of weld clip 36) |
| 80 | Opening (of pusher 39) |
| 82 | Front surface (of pusher 39) |
| 84 | Clip stack |
| 86 | Magazine |
| 88 | Protrusion (of retention pin 40) |
| 89 | Ramp surface (of retention pin 40) |
| 90 | Inclined surface (of retention pin 40) |
| 92 | Retention surface (of retention pin 40) |
| 94 | Aperture (of arms 66) |
| 96 | Sidewalls (of magazine holder assembly 34) |
| 98 | Interior area (of magazine holder assembly 34) |
| 100 | Retention plate (of magazine holder assembly 34) |
| 102 | Orifice (of retention plate 100) |
| 103 | Rear opening (of magazine holder assembly 34) |
| 104 | Front opening (of magazine holder assembly 34) |
| 106 | Recess (of retention plate 100) |
| 108 | Top wall (of magazine holder assembly 34) |
| 110 | Bottom wall (of magazine holder assembly 34) |
| 112 | First sidewall (of magazine holder assembly 34) |
| 114 | Second sidewall (of magazine holder assembly 34) |
| 115 | Interior portion (of sidewalls 112, 114) |
| 116 | Track |
| 118 | Stationary rack |
| 120 | Moveable rack |
| 122 | Inner side wall (of stationary rack 118) |
| 124 | Inner side wall (of moveable rack 120) |
| 126 | Teeth |
| 128 | Pusher arm (of pusher 39) |
| 130 | Inclined surface (of teeth 126) |
| 132 | Abutment surface (of movable rack 120) |
| 133 | Outer wall (of movable rack 120) |
| 134 | Slider tab |
| 136 | Spring (of magazine holder assembly 34) |
| 138 | Retention arm (of magazine holder assembly 34) |
| 140 | Front portion (of retention arm 138) |
| 141 | Spring (of retention arm 138) |
| 142 | Cam surface (of retention arm 138) |
| 144 | Actuator (of spindle 49) |
| 146 | Pawl mechanism (of magazine holder assembly 34) |
| 147 | Spring (of pawl mechanism 146) |
| 148 | First tooth |
| 150 | Second tooth |
| 152 | Curtain |
| 154 | Electrode orifice (of curtain 152) |
| 156 | Skewer orifice (of curtain 152) |
| 158 | Slit (of curtain 152) |

DETAILED DESCRIPTION OF THE INVENTION

The present invention will now be described more fully with reference to the accompanying drawings, in which several embodiments are shown. This invention may, however, be embodied in many different forms and should not be construed as limited to the embodiments set forth here. Rather, these embodiments are examples of the invention, which has the full scope indicated by the language of the claims. Like numbers refer to like elements throughout. It should be noted that the term "comprising" does not exclude other elements or steps and that "a" or "an" do not exclude a plurality.

FIGS. 1-8 illustrate a tool 10 according to an embodiment of the present invention. Depending of the type of tool 10, the tool 10 may be configured to be operably connected to an ancillary device, such as for example, a welder, controller, air compressor, and/or power source, among others. For example, the tool 10 illustrated in FIG. 1 may be a stud welding tool or gun that is operably connected to a stud welder via one or more cables 11, such as a control cable and/or a weld cable.

According to the illustrated embodiment, the tool 10 includes a housing 12 and a shield assembly 14. The shield assembly 14 may be operably connected to the housing 12, such as, for example, by mating threaded portions of shield assembly 14 and housing 12, through the use of mechanical fasteners, including, for example, screws, bolts, pins, and/or via interference, compression, or friction fits, among other connections. In the illustrated embodiment, the shield assembly 14 includes a front portion 16, a base portion 18, and a curtain 152 (as shown, for example, in FIG. 25). A retention collar 20 of tool 10 may be configured to receive the base portion 18 and include a connector used to secure the retention collar 20 to the housing 12, such as, for example via a threaded, interference, friction, or compression engagement or mechanical fasteners, among other connections and engagements. For example, according to certain embodiments, the retention collar 20 may be secured to the tool 10, such as by a threaded engagement between the retention collar 20 and a retention collar tightening ring 21 that is connected to the tool 10. Additionally, according to certain embodiments, at least a portion of the base portion 18 may have a size, such as a diameter, that prevents the removal of the base portion 18 from the retention collar 20 at least when the retention collar 20 is secured to the housing 12.

The front portion 16 of the shield assembly 14 may be operably secured to the base portion 18 in a variety of different manners, including, for example, via mechanical fasteners 22, such as, for example, via a threaded, interference, friction, or compression engagement or mechanical fasteners, among other connections and engagements. The curtain 152 can be configured to shield and/or protect portions of the interior region 32 of the tool 10 from splatter and other potentially harmful residue generated during the welding operation, as described below with respect to FIG. 25.

While in the illustrated embodiment the shield assembly 14 is described as having a separable front portion 16, base portion 18, and curtain 152, according to other embodiments, two or more of the foregoing may be part of a single, unitary construction.

According to the illustrated embodiment, the housing 12 may be molded or otherwise formed to include first and second sides 24, 26 that, when assembled together, generally define an inner region 32 of the tool 10. The inner region 32 of the tool 10 may be configured to receive various components used in the operation of the tool 10, as discussed below in more detail.

The first and second sides 24, 26 may be connected together in a variety of different manners, including through the use of interference fits, adhesives, and/or mechanical fasteners, among others. For example, FIG. 1 illustrates a first side 24 that is attached to a second side 26 through at least the use of a plurality of mechanical fasteners 28 that extend at least through the first side 24 and engage the second side 26, such as, for example a threaded portion of the second side 26.

The housing 12 may also be configured to provide a handle 25 or connecting region for a user and/or robotic or mechanical device to hold on to or otherwise be attached to the tool 10. According to certain embodiments, the handle 25 may include or be operably connected to an activator 27 that may be configured to activate the operation of the tool 10. For example, according to certain embodiments in which an individual is holding the tool 10, the activator 27 may be a trigger button or switch that is depressed or otherwise manipulated by the user to activate the tool 10. According to other embodiments, the actuator 27 may be remote from the tool 10 and/or housing, such as, for example, the actuator 27 being a foot pedal control that may be used in activating the tool 10. Further, for robotic or mechanical device applications, the activator 27 may be a switch or circuit, among others, located in the tool 10 or ancillary device.

Operation of the activator 27 may be used to perform a variety of different functions, such as, for example, adjusting the location of one or more consumables in the tool 10, such as weld clips 36, among other functions. For example, according to certain embodiments, the activator 27 may be configured to provide a signal indicating that a weld clip 36 being held in a magazine holder assembly 34 is to be moved to a load position in which the weld clip 36 is gripped an electrode arm 60a, 60b, as discussed below. The activator 27 may also be activated to move the position of the electrode arms 60a, 60b with, or without, the weld clip 36, such as moving the gripped weld clip 36 from the load position to a weld position, where the weld clip 36 may be positioned for being welded to a work piece. Additionally, activation of the activator 27 may be used to provide the electrode arms 60a, 60b with current that is used during a welding operation. According to certain embodiments, the timing, duration of time, and/or the number of times the activator 27 is activated within a time period may indicate which of these functions, among others, is to occur.

Figure 4:
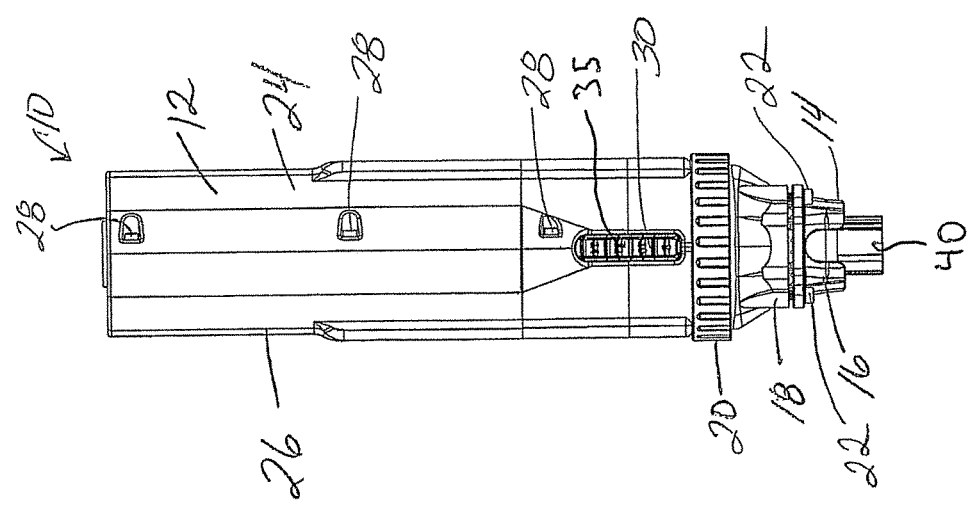
FIGS. 4 and 5 illustrate top and bottom views, respectively, of the tool illustrated in FIG. 1.
Figure 5:
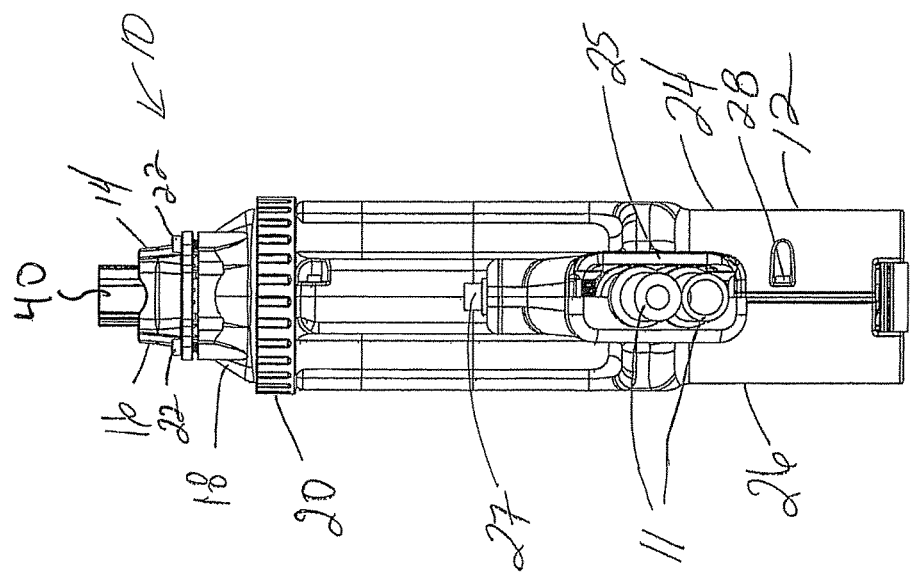
Figure 6:
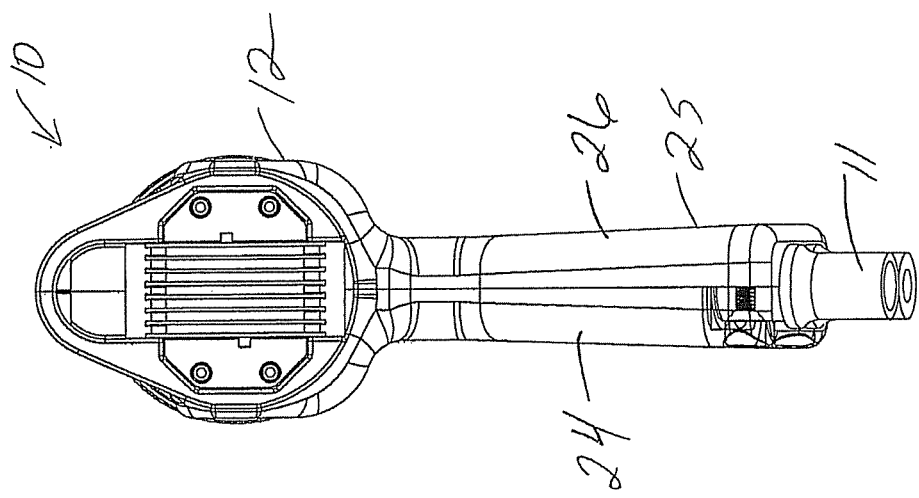
FIG. 6 illustrates a rear view of the tool illustrated in FIG. 1.

As shown in at least FIGS. 1 and 4, the first and/or second sides 24, 26 of the housing 12 may also be formed to provide a window 30 that may be used to indicate the number of dispensable consumables, such as weld clips 36, contained in a magazine 86 in the tool 10. Further, according to certain embodiments, the window 30 may include a transparent cover 35 which may include or be used with markings, such as numbering for example, which may be used to evaluate the number of remaining weld clips 36 in the magazine 86.

Figure 7:
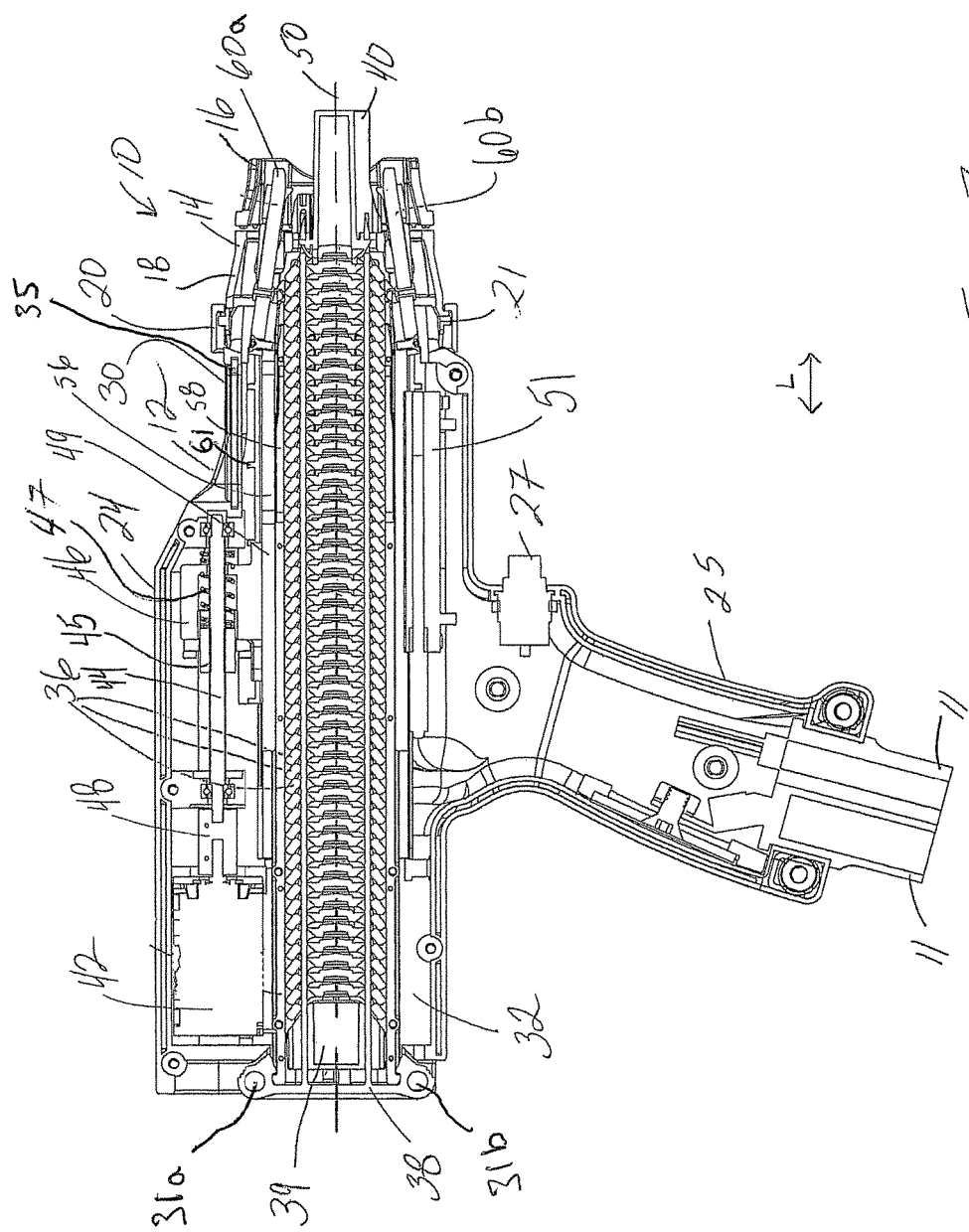
FIG. 7 illustrates a cross sectional side view of the tool taken along line A-A in FIG. 1.

FIG. 7 illustrates a cross sectional side view of the tool 10 taken along line A-A in FIG. 1, and exposes a portion of the interior region 32 of the housing 12. The interior region 32 is shown as generally containing a magazine holder assembly 34 that contains an assembly or grouping of a plurality of weld clips 36, such as, for example, weld clips 36 that may stacked against adjacent weld clips 36 to provide a clip stack 84. According to certain embodiments, the magazine holder assembly 34 may also include or otherwise be configured to receive a cartridge skewer 38 and a pusher 39. As discussed below in more detail, the cartridge skewer 38 may be configured to at least assist in loading the weld clips 36/clip stack 84 into the magazine holder assembly 34. Additionally, the cartridge skewer 38 may at least temporarily include, or be operably connected to, a retention pin 40 that is used to retain weld clips 36 in operable engagement with the cartridge skewer 38 at least before and/or during loading of the weld clips 36 into the magazine holder assembly 34 and/or tool 10.

According to certain embodiments, the interior region 32 of the tool 10 may also include a motor 42 that drives a lead screw 44 that mates a lead screw nut 45, which may be housed in a nut housing 46. Further, according to certain embodiments, the motor 42 may be connected to the lead screw 44 via a coupling 48. Additionally, according to certain embodiments, the nut housing 46 may be mounted, or otherwise connected to, a spindle 49. At least a portion of the spindle 49 may be adjacent to the magazine holder assembly 34. According to certain embodiments, the spindle 49 may be configured to traverse over at least a portion of the magazine holder assembly 34. Moreover, the nut housing 46 may be configured to laterally displace the spindle 49 in at least two directions (as indicated by "L" in FIG. 7) along an axis that is generally parallel to a central longitudinal axis 50 of the magazine holder assembly 34. Such movement may be employed in indexing weld clips 36 in the magazine holder assembly 34 as well as engaging a weld clip 36 with the electrode arms 60a, 60b, as discussed below. Additionally, both the spindle 49 and the magazine holder assembly 34 may include apertures 56, 58 that are in communication with the window 30 of the housing 12 so as to provide a view from outside the housing 12 of at least a portion of the weld clips 36 inside the tool 10.

According to certain embodiments, the electrode arms 60a, 60b, may be laterally displaced between a plurality of different positions by the lateral displacement of the spindle 49 and/or by pressing the electrode arms 60a, 60b and/or a weld clip 36 loaded in the electrode arms 60a, 60b against a work piece. For example, the motor 42 may drive the lead screw 44 to cause the spindle 49, and thus the electrode arms 60a, 60b, to move in a general direction toward the rear portion 15 of the housing 12. During such movement, the electrode arms 60a, 60b may engage a weld clip 36 that is to be dispensed from the tool 10 such that the weld clip 36 is loaded into and/or between the electrode arms 60a, 60b. Conversely, the motor 42 may also drive the lead screw 44 to cause the spindle 49, and thus the electrode arms 60a, 60b, to be displaced in a general direction away from the rear portion 15 of the housing 12 such that the electrode arms 60a, 60b travel from a load position to a home position. During such movement, the electrode arms 60a, 60b may at least assist in moving the weld clip 36 that is loaded between the electrode arms 60a, 60b to move away from the magazine holder assembly 34 and/or magazine assembly 64, as discussed below.

Further, the electrode arms 60a, 60b may also be displaced from the home position to a weld position. The electrode arms 60a, 60b may be moved to a weld position by pressing the electrode arms 60a, 60b and/or the weld clip 36 that is loaded into the electrode arms 60a, 60b against a work piece. When displaced from the home position to the weld position, the electrode arms 60a, 60b may again move in a general direction toward the rear portion 15 of the housing 12. The distance the electrode arms 60a, 60b may be laterally displaced when moving from the home position to the weld position may be limited, at least in part, by the compressive force of a spring, such as, for example, the spring 47 shown in FIG. 7. Further, the weld position may also be adjusted by operation of the motor 42 to move the position of the spindle 49 and electrode arms 60a, 60b, as previously discussed. Such operation of the motor for purposes of the weld position may allow the weld clip 36 and electrode arms 60a, 60b to be backed away from the work piece so that arcing for welding may occur, and resulting puddle of molten metal may form. The motor may then again adjust the weld position to allow the weld clip 36 to be moved toward, and plunged into, the puddle of molten metal so that the weld clip 36 is welded to the work piece. Such alteration of the weld position by operation of the motor may also adjust characteristics of the welding operation, such as arc time and weld current.

According to certain embodiments, the linear position of the spindle 49 may be sensed using a position sensor 51. The position sensor 51 may be operably connected to the ancillary device, such as, for example, a control board of a welder. The position sensor 51 may provide, for example, a signal indicative of the location of the spindle 49 relative to the interior region 32 of the housing 12 and/or of the magazine holder assembly 34. Additionally, such information may be used during the indexing of weld clips 36 in the magazine holder assembly 34, the loading of a weld clip 36 into the electrode arms 60a, 60b so that the weld clip 36 is in the load position, and/or the displacement of the weld clip 36 with the electrode arms 60a, 60b to a weld position. A variety of different types of sensors may be used for the position sensor 51, including, for example, a potentiometer, among other sensors.

Figure 8:
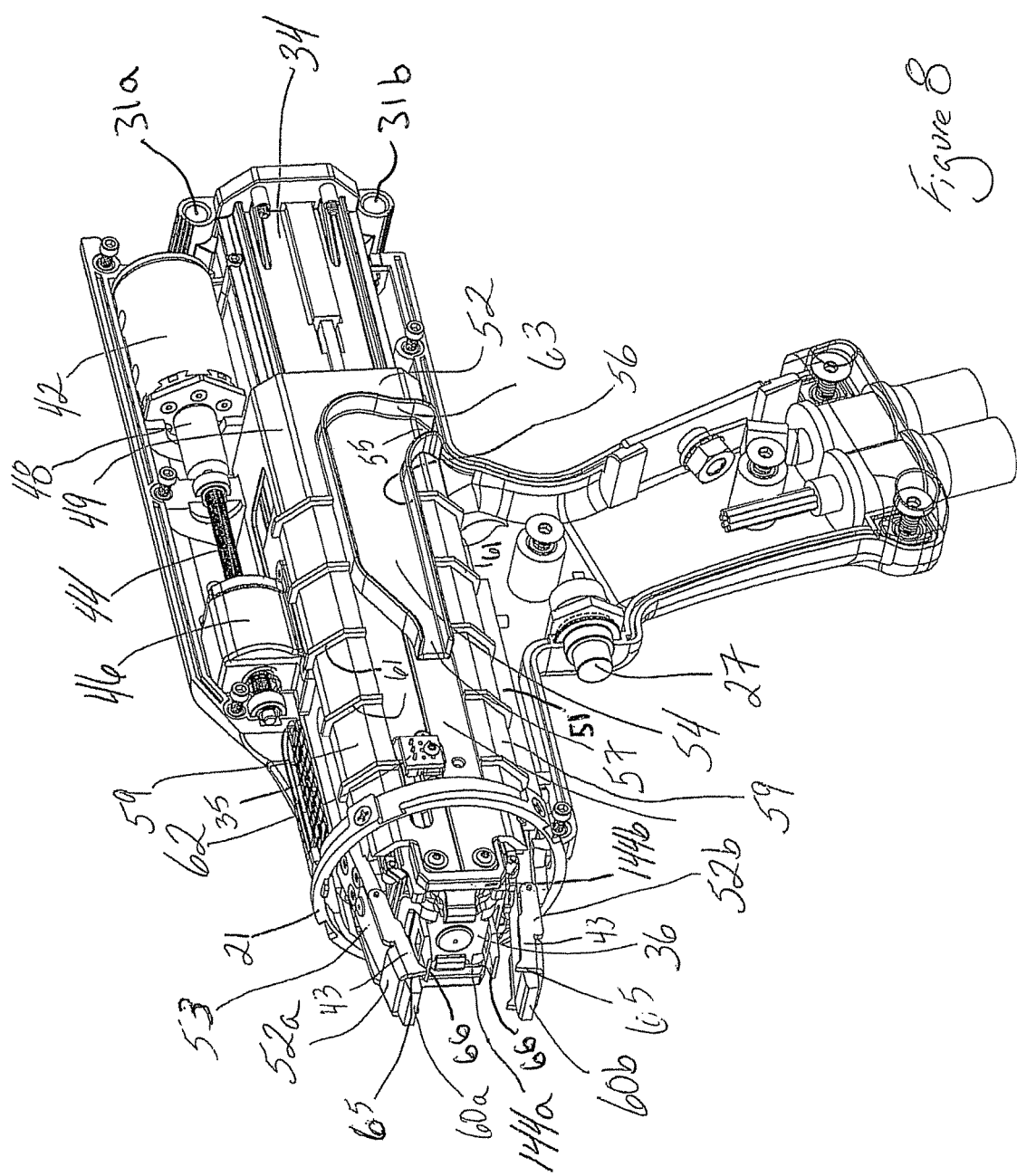
FIG. 8 is a perspective side view of the tool shown in FIG. 1 with the first side of the housing and the shield assembly removed.

As shown in FIG. 8, a cable guide 54 is configured to guide at least a portion of the portion of the cables 11 that are in the interior region 32 so as to prevent the cables 11 from interfering with, or being damaged by, the movement of the spindle 49. According to the illustrated embodiment, the guide 54 may include a one or more outer walls 63 that are configured to provide an inlet 55 and outlet 57 for passage of the cables 11 through the cable guide 54. Further, the outer walls 56 may be spaced apart to provide sufficient space in the cable guide 54 to accommodate changes in the quantity of a cable(s) 11 that may be present in the cable guide 54 as the lateral position of the spindle 49 changes. According to certain embodiments, the cable guide 54 may remain in a relatively fixed location relative to the housing 12 of the tool 10.

According to certain embodiments, the movement of the spindle 49 may be guided, at least in part, by one or more spindle bearings 59. According to the illustrated embodiment, a spindle bearing 59 may extend along at least one outer edge of the spindle 49. For example, a spindle bearing 59 may be positioned about each of the four corners of the spindle 49. The spindle bearing 59 may be configured to prevent or minimize the spindle 49 from being turned, twisted, or otherwise pulled askew from the central axis 50 when the spindle 49 is being laterally displaced. In the illustrated embodiment, spindle bearings 59 include one or more ribs 61 that are configured to contact and/or have minimal clearance with the housing 12 so as to limit lateral movement of the spindle bearings 59.

The spindle 49 may be operably connected to at least one electrode arm 60. In the illustrated embodiment, the at least one electrode arm 60 may include a first electrode arm 60a and a second electrode arm 60b. According to certain embodiments, one or more of the cables 11 may be operably connected to the spindle 49 and/or electrode arms 60a, 60b to deliver electricity to the electrode arms 60a, 60b. For example, activation of the activator 27 may provide a signal that indicates that the auxiliary device is to transmit electricity through the cable 11 to the spindle 49 and/or electrode arm 60a, 60b for use in the welding operation.

Additionally, according to certain embodiments, clip back-up arms 52a, 52b may be pivotally connected to the electrode arms 60a, 60b. The clip back-up arms 52a, 52b may be configured to at least assist the electrode arms 60a, 60b in retaining a grip on a weld clip 36 that has been dispensed from the magazine holder assembly 34 in a load and/or weld position, as discussed below. According to certain embodiments, the clip back-up arms 52a, 52b may be spring loaded, such as, for example, through the use of a spring 53, such as, for example, a leaf spring, among other configurations. When the electrode arms 60a, 60b are moved toward the load position, the electrode arms 60a, 60b may engage a weld clip 36 that is to be dispensed from the magazine assembly 64. Further, as the electrode arms 60a, 60b move toward the load position, the weld clip 36 that is to be dispensed may also engage one or more leading edges 43 of the clip back-up arms 52, 52b, thereby causing the rotatable displacement of the clip back-up arms 52, 52b. When the weld clip 36 passes, and is no longer engaging the leading edges 43 of the clip back-up arms 52a, 52b, the clip back-up arms 52am 52b may be pivoted back into position by a spring 53, such as, for example, a leaf spring. The weld clip 36 may then be positioned adjacent to and/or against, a backing surface(s) 65 of the clip back-up arms 52. During a welding operation, when the electrode arms 60a, 60b and/or weld clip 36 are pressed against a work piece, the backing surface 65 of the clip back-up arms 52 may retain the weld clip 36 within, and/or prevent movement of the weld clip 36 relative to, the electrode arms 60a, 60b.

According to certain embodiments, the tool 10 may also include a weld clip sensor 62 that is used in detecting whether the magazine holder assembly 34 does and/or does not contain any weld clips 36. Alternatively, according to certain embodiments, the weld clip sensor 62 may be used to detect the number of weld clips 36 that have been dispensed from the magazine holder assembly 34 and/or the number of weld clips 36 that remain in the magazine holder assembly 34. Additionally, according to certain embodiments, the tool 10 may also include a magazine sensor, which may at least provide a signal indicative of whether a magazine 86, magazine assembly 64, and/or cartridge skewer 38 is detected to be present in the tool 10.

Figure 9:
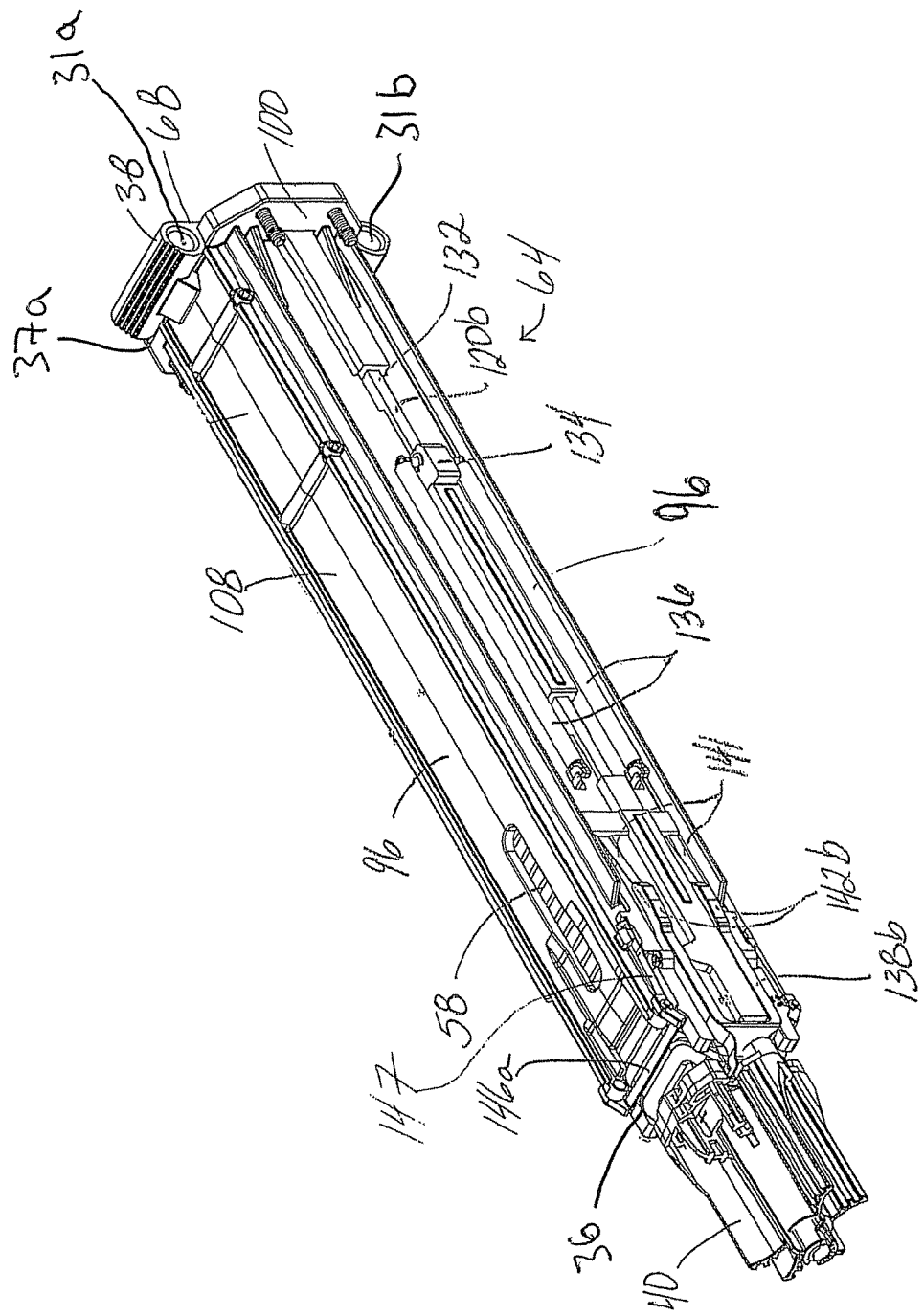
FIG. 9 is a perspective side view of a magazine assembly.
Figure 10:
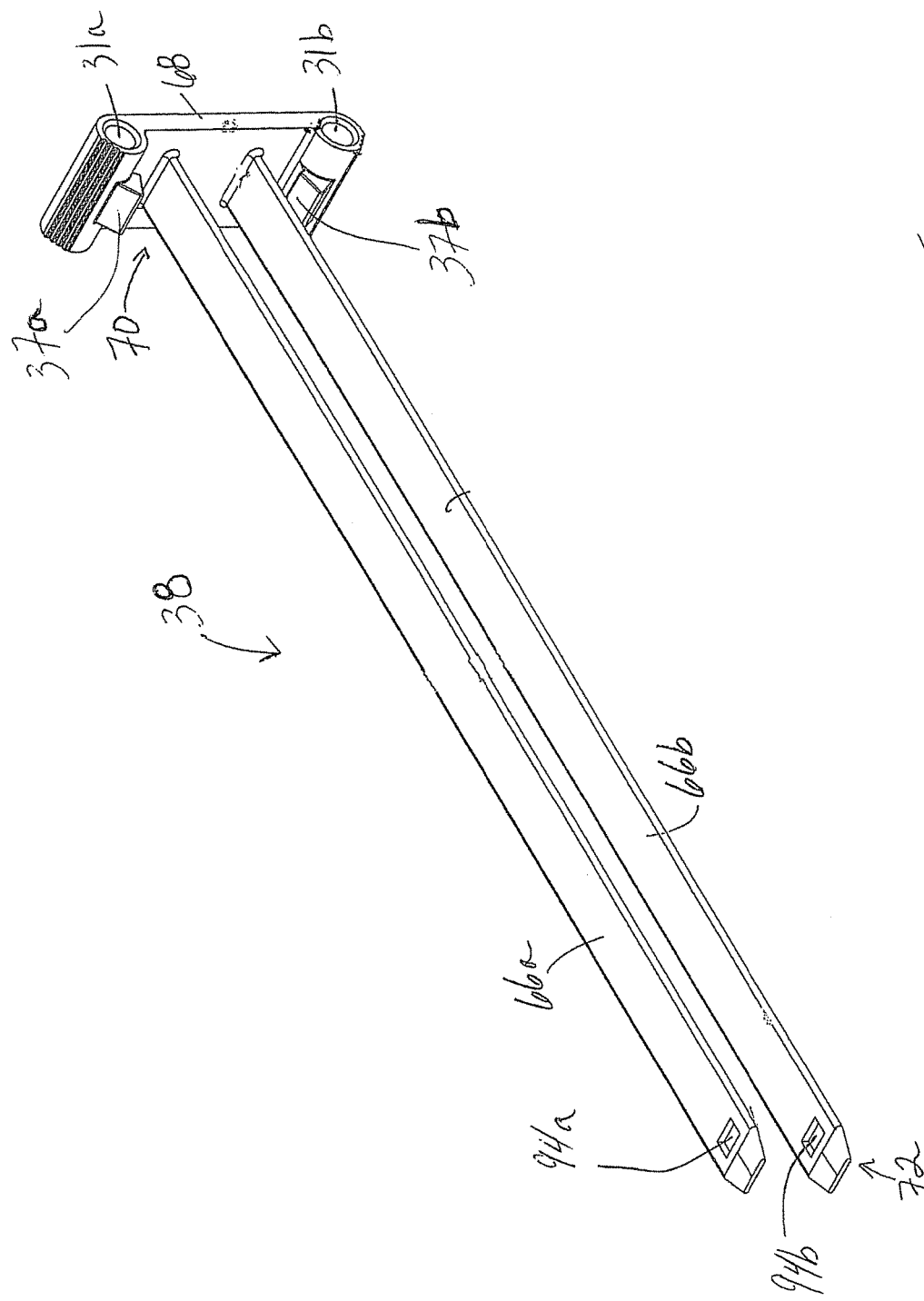
FIG. 10 illustrates a perspective side view of a cartridge skewer.

FIG. 9 is a perspective view of a magazine assembly 64 according to certain embodiments of the present invention. The magazine assembly 64 may include the magazine holder assembly 34 and a magazine 86. According to certain embodiments, the magazine 86 may include a cartridge skewer 38, retention pin 40, and pusher 39. FIG. 10 illustrates a perspective view of one embodiment of the cartridge skewer 38. The cartridge skewer 38 includes at least one arm 66a, 66b that extends from a back wall 68 at a distal end 70 of the cartridge skewer 38 to a proximal end 72 of the cartridge skewer 38. According to certain embodiments, the back wall 68 of the cartridge skewer 38 may also include skewer latching tabs 37a, 37b that may be utilized in securing the cartridge skewer 38 to the magazine holder assembly 34. For example, the latching tabs 37a, 37b may be configured for a press or snap fit with a surface or ridge in the recess 106 of the retention plate 100. Additionally, the back wall 68 may also provide a location for a user and/or machinery, including robotics arms, to engage the magazine 86 during at least the loading and/or unloading of the magazine 86 into the tool 10 and/or magazine holder assembly 34. For example, in the illustrated embodiment, the retention plate 100 may include one or more orifices 31a, 31b that may be configured to receive the insertion of a device or structure, such as the prongs of, or connect to, a robotic arm. Thus, when at least the cartridge skewer 38 is to be removed from the tool 10 and/or magazine assembly 64, a device or structure may be inserted into the orifice(s) 31a, 31b, and a force may be exerted by/through the device or structure to displace the cartridge skewer 38, such as to pull the cartridge skewer 38 out of the magazine assembly 64.

Figure 11:
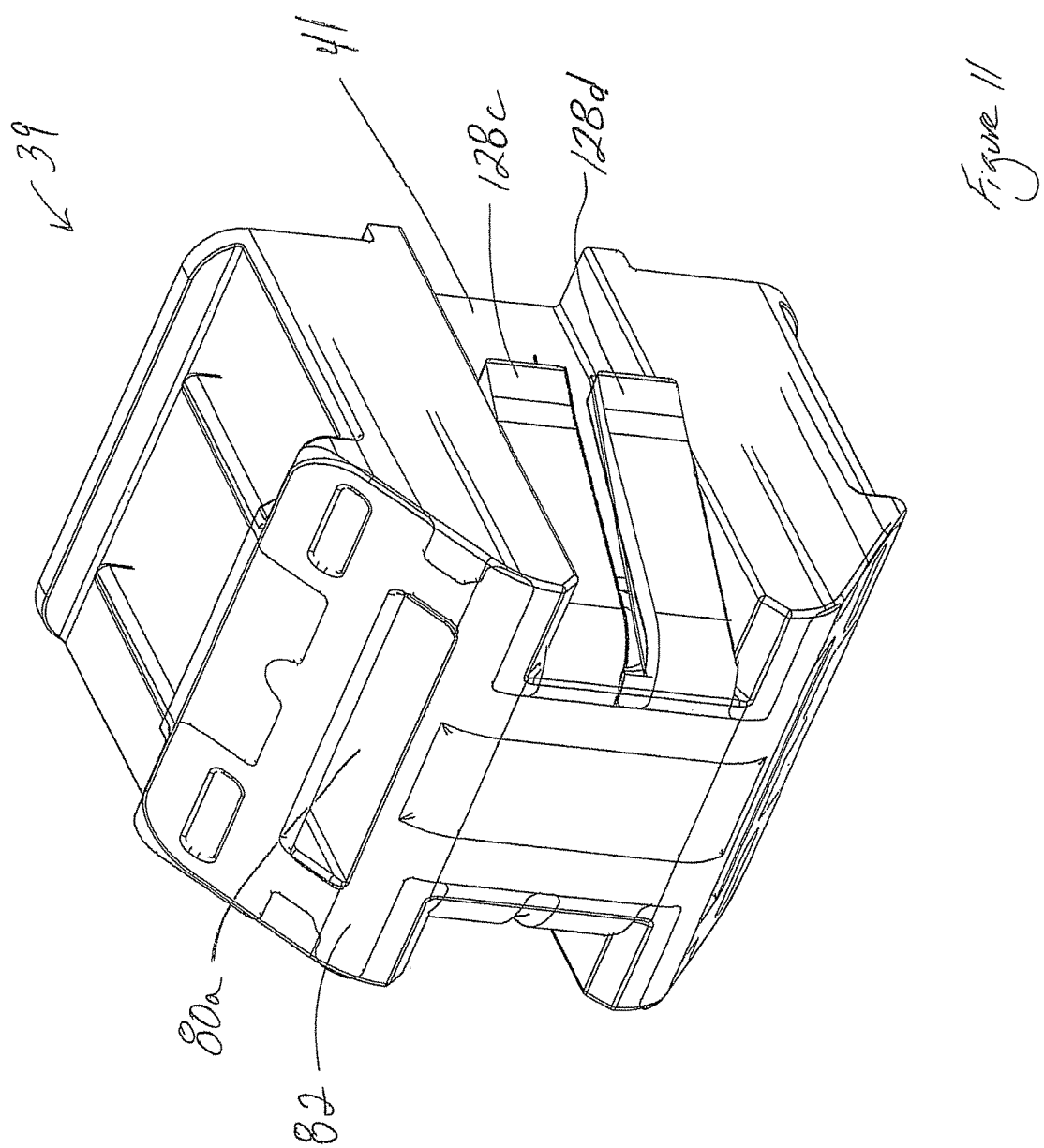
FIG. 11 illustrates a perspective side view of a pusher.
Figure 12:
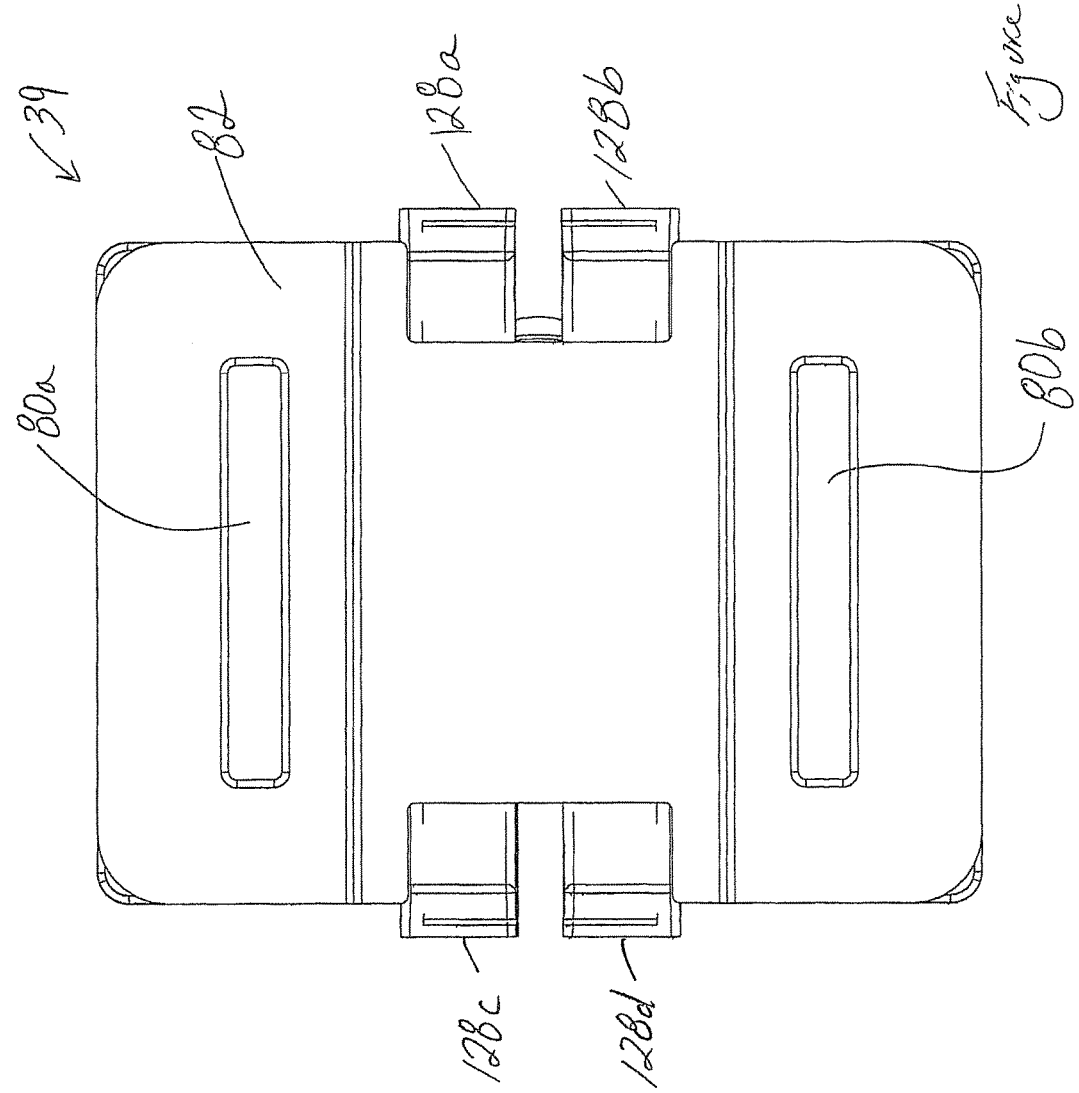
FIG. 12 illustrates a front view of the pusher illustrated in FIG. 11.
Figure 13:
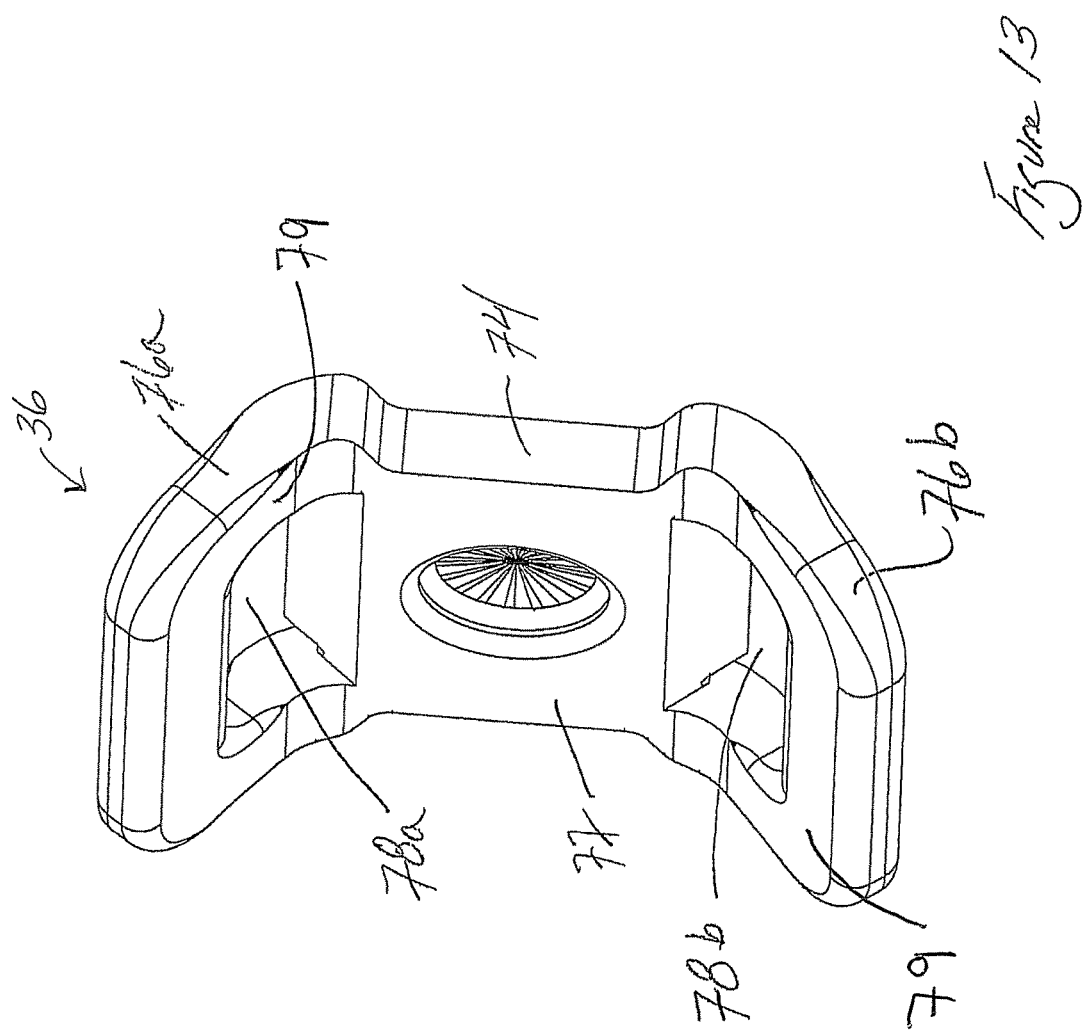
FIG. 13 illustrates a perspective side view of a welding clip.

As shown by at least FIG. 10, in the illustrated embodiment, the cartridge skewer 38 includes two arms 66a, 66b that are sized and positioned to receive the slideable placement of the pusher 39 and a plurality of weld clips 36, such as, for example, the clip stack 84. Referencing FIGS. 11 and 12, the pusher 39 may include a pair of openings 80a, 80b that are configured to receive the insertion of the arms 66a, 66b of the cartridge skewer 38 such that the pusher 39 may be displaced along the arms 66a, 66b. Similarly, the welding clips 36 may also be configured to receive the insertion of the at least one arm 66a, 66b of the cartridge skewer 38. For example, FIG. 13 illustrates an exemplary weld clip 36 having a base portion 74, and a pair of winged portions 76a, 76b. Although FIG. 13 illustrates two wing portions 76a, 76b, according to other embodiments, the weld clip 36 may have a single wing 76, or more than two wing portions 76a, 76b.

Figure 14:
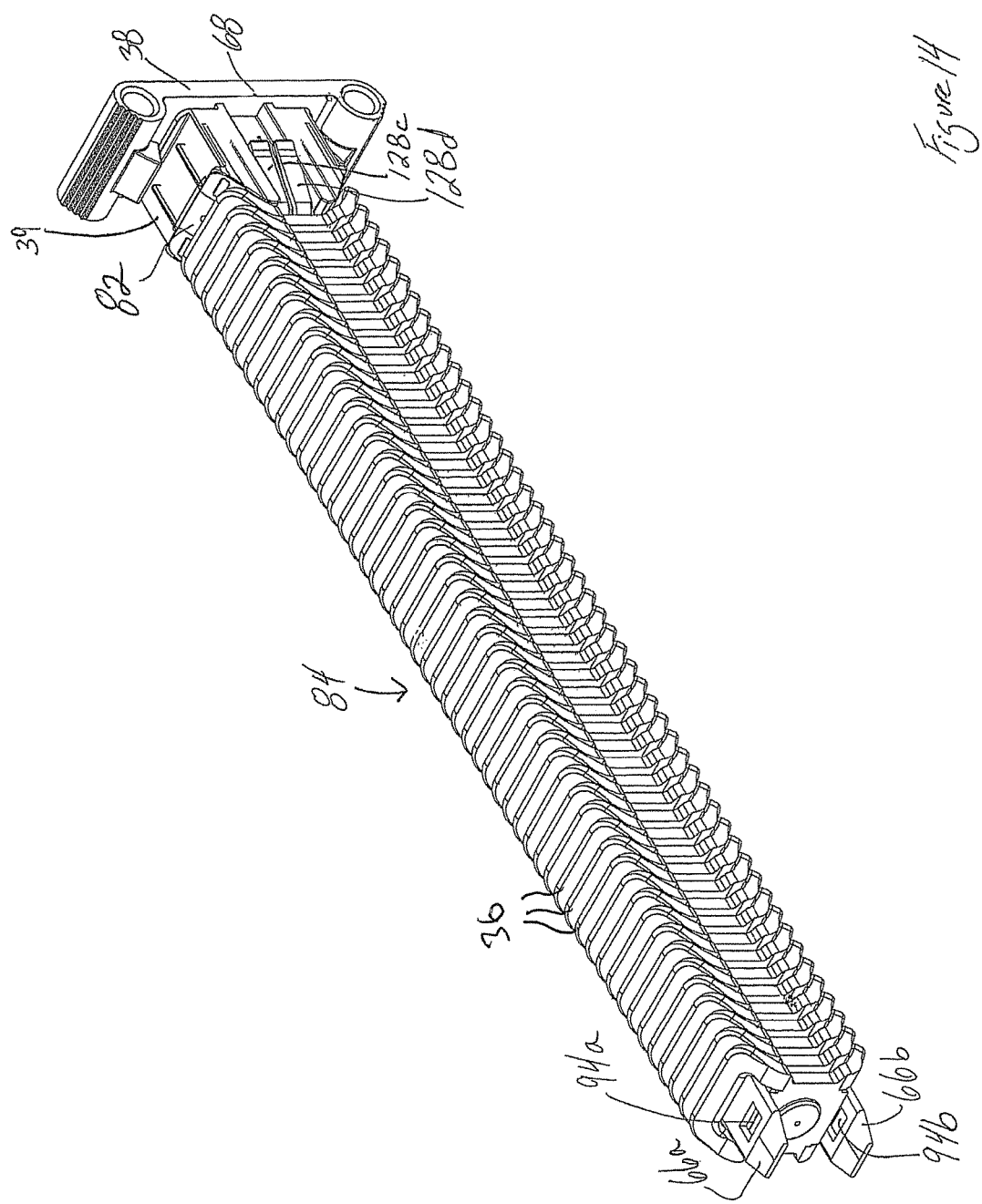
FIG. 14 is a side perspective side view of a plurality of weld clips and a pusher loaded onto the arms of the cartridge skewer illustrated in FIG. 10.

According to certain embodiments, one or more of the winged portion 76a, 76b may extend from the base portion 74 of the weld clip 36 to form an obtuse angle. For example, face wall 77 of the base portion 74 may be separated from an upper surface 79 of the winged portion 76a by an obtuse angle. Further, according to certain embodiments, one or more of the winged portions 76a, 76b may form an angle with the base portion 74 that is different than the angle between the base portion 74 and another winged portion 76a, 76b. Further, as shown in at least FIGS. 7, 14, and 15, the configuration of the weld clips 36 may allow for a plurality of weld clips 36, or clip stack 84, to be stacked together on the cartridge skewer 38 in a relatively compressed manner, as illustrated, for example, in the clip stack 84.

As shown, in the illustrated embodiment, each winged portion 76a, 76b includes a window 78a, 78b that is configured to receive the insertion of an arm 66a, 66b through the window 78a, 78b of the weld clip 36. Additionally, according to certain embodiments, at least a portion of the front surface 82 of the pusher 39 may have a shape that is similar to that of the adjacent weld clip 36 of the clip stack 84 so as to allow for a mating engagement between front surface 82 of the pusher 39 and the adjacent weld clip 36.

Figure 15:
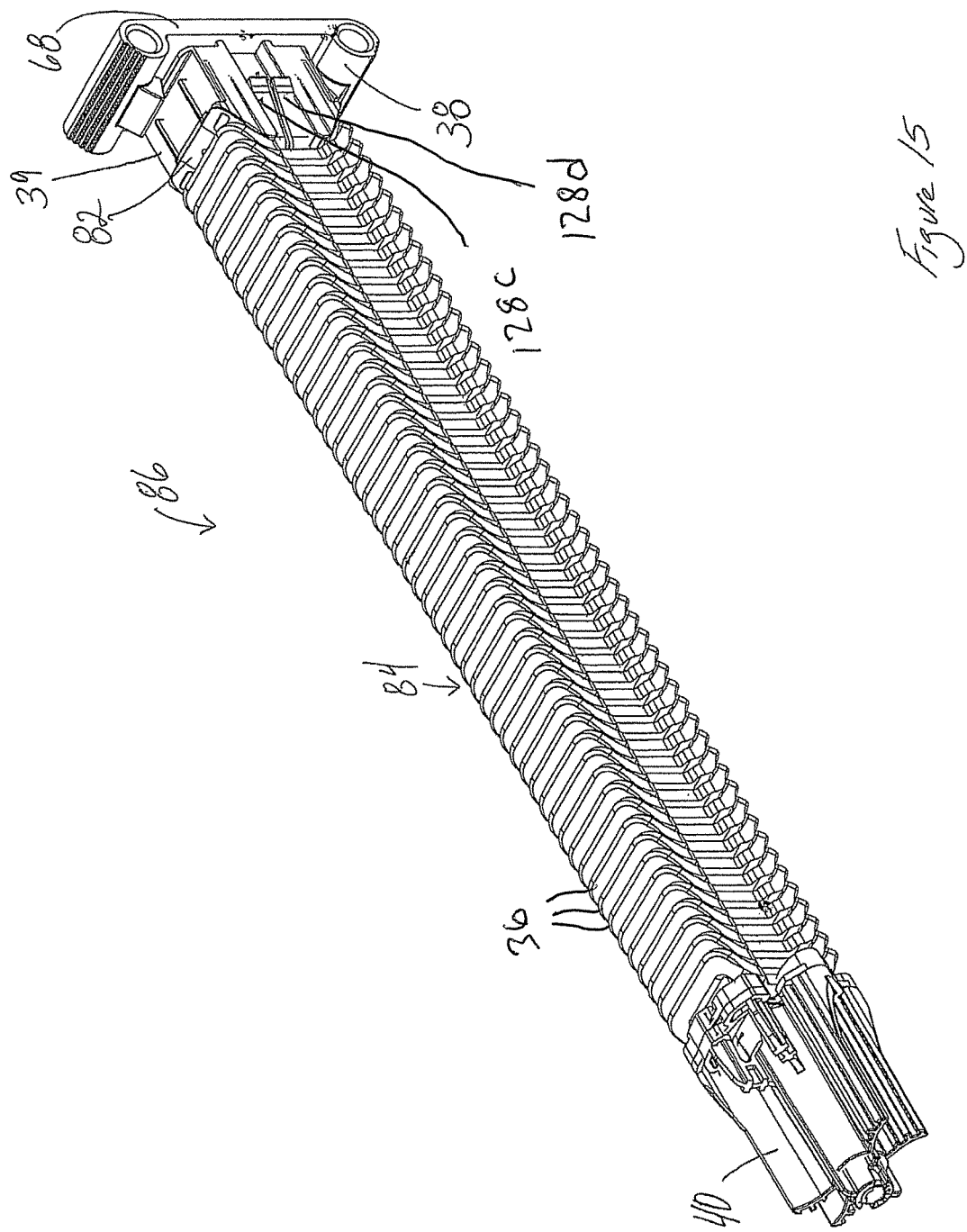
FIG. 15 illustrates a perspective side view of a magazine.

FIG. 15 illustrates a magazine 86 having the cartridge skewer 38, pusher 39, clip stack 84, and retention pin 40. The retention pin 40 may be configured to at least temporarily assist in retaining the clip stack 84 and/or pusher 39 on the arms 66a, 66b of the cartridge skewer 38, such as, for example, before and during the loading of the magazine 86 into the magazine holder assembly 34. According to certain embodiments, the retention pin 40 may be operably connected or mounted to at least one arm 66a, 66b so as to provide a barrier to prevent the removal of weld clips 36 from the proximal end 72 of the cartridge skewer 38. Additionally, according to certain embodiments, the back wall 68 of the cartridge skewer 38 may also assist in retaining weld clips 36 and pusher 39 on the cartridge skewer 38.

Figure 16:
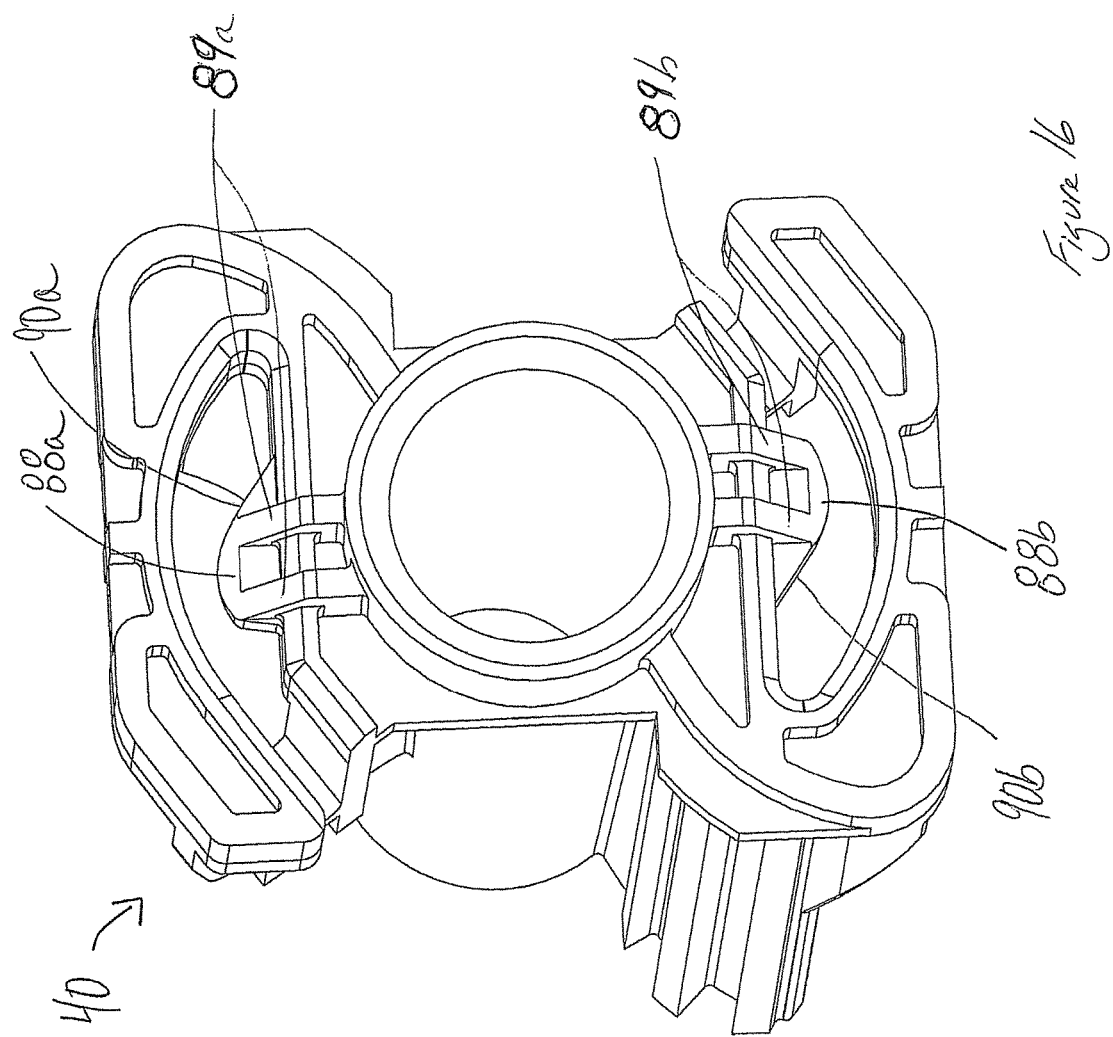
FIG. 16 illustrates a rear perspective view of a retention pin.
Figure 17:
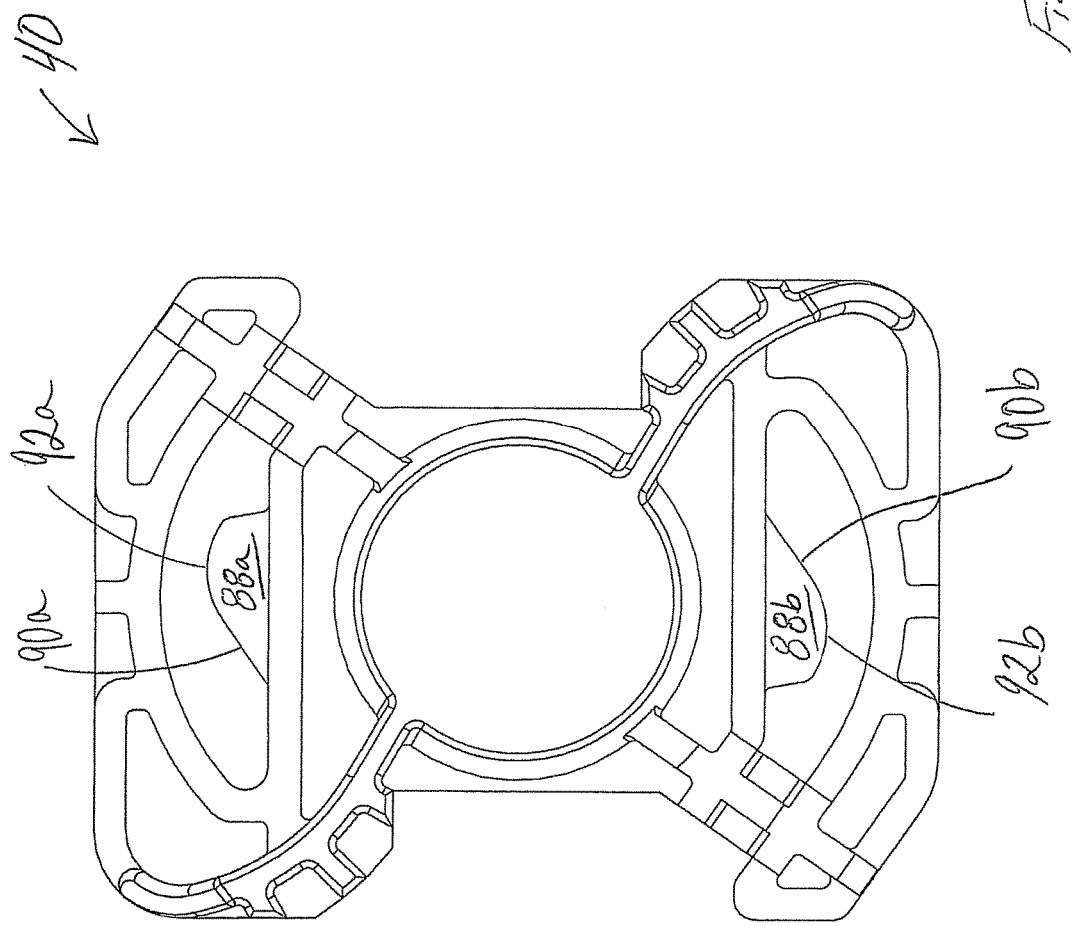
FIG. 17 illustrates a front view of the retention pin shown in FIG. 16.

The retention pin 40 may have a variety of different shapes and configurations. For example, as shown in at least FIGS. 10, 15, and 16, the retention pin 40 includes at least one protrusion 88a, 88b that is configured to be at least partially received in an aperture 90a, 90b of the arms 66a, 66b of the cartridge skewer 38. According to certain embodiments, the protrusion 88a, 88b may include at least one ramp surface 89a, 89b, inclined surface 90a, 90b, and a retention surface 92a, 92b. When the retention pin 40 is to be secured to the cartridge skewer 38, the retention pin 40 may be pushed or slid along the arms 66a, 66b from the proximal end 72 and generally toward the distal end 70 of the cartridge skewer 38. As the retention pin 40 contacts the arms 60a, 60b, the arms 60a, 60b may engage the ramp surface 89a, 89b of the retention pin 40. The ramp surfaces 89a, 89b may be configured to push and/or deflect at least the portions of the arms 60a, 60b apart so that the protrusion 88a, 88b may be slid into place in the aperture 94a, 94b. When the protrusion 88a, 88b reaches the aperture 94a, 94b, the ramp surface 89a, 89b may no longer deflect, or may minimally push, the arms 60a, 60b so that the arms 60a, 60b may generally return to a pre-deflected orientation. The engagement of the retention surface 92a, 92b with the aperture 94a, 94b is configured to secure the retention pin 40 to the cartridge skewer 38. Moreover, the retention surface 92a, 92b may be configured to be inserted into and/or through the aperture 94a, 94b so as to secure the retention pin 40 to the arms 66a, 66b of the cartridge skewer 38. When a clip stack 84 is loaded onto the cartridge skewer 38 and the retention pin 40 is secured to the arms 66a, 66b, the retention pin 40 is configured to prevent the removal of weld clips 36 along the proximal end 72 of the cartridge arms 66a, 66b.

When the retention pin 40 is to be removed from the cartridge skewer 38, the retention pin 40 may be twisted so that a portion of the proximal end 72 of the arms 66a, 66b contact an inclined surface 90a, 90b of the protrusion 88a, 88b. As the retention pin 40 continues to be twisted, distance between the portions of the inclined surfaces 90a, 90b that are in contact with the arms 66a, 66b increases so as to push or otherwise spread apart at least the portion of the arms 66a, 66b that are in contact with the inclined surfaces 66a, 66b. The continued twisting of the retention pin 40 may then allow a retention surface 92a, 92b move out of the aperture 94a, 94b, thereby allowing for removal of the retention pin 40 from the cartridge skewer 38.

FIGS. 18-24 illustrate a magazine holder assembly 34 according to an illustrated embodiment. The magazine holder assembly 34 is configured to receive at least a portion of the magazine 86. Moreover, the magazine holder assembly 34 may be configured to receive the insertion of at least the retention pin 40, weld clips 36, and pusher 39 of the magazine holder assembly 34. According to the illustrated embodiment, the magazine holder assembly 34 includes sidewalls 96 that generally define an interior area 98 of the magazine holder assembly 34. The interior area 98 may be in communication with rear and front openings 103, 104 positioned at opposite ends of the housing 96. The rear opening 103 may be configured to receive at least a portion of the magazine 86, such as when a magazine 86 is being loaded into the magazine holder assembly 34, while the front end 104 may be at least configured for the passage and/or dispensing of weld clips 36 from the interior area 98 during operation of the tool 10.

The housing 96 may include a retention plate 100 that is configured to secure the magazine holder assembly 34 to the tool 10. For example, according to certain embodiments, the retention plate 100 may include one or more orifices 102 that are configured to receive the insertion of mechanical fasteners, such as, for example, screws, bolts, and/or pins, among other securing mechanisms, that engage with other portions of the tool 10, such as, for example, the housing 12, so as to secure the magazine holder assembly 34 to the housing 12. Further, the rear opening 103 may extend through the retention plate 100. Additionally, as previously discussed, according to the illustrated embodiment, the retention plate 100 may also include a recess 106 that is configured to receive at least a portion of the back wall 68 of the cartridge skewer 38. According to certain embodiments, the recess 106 may be configured to allow at least a portion of the back wall 68 of the cartridge skewer 38 to be generally flush or even with an outer wall 108 of the retention plate 100 when the magazine 86 is positioned within the tool 10. Further, the retention plate 100 and/or back wall 68 may be sized so as to prevent the back wall 68 from entering into the interior area 98 of the magazine holder assembly 34. According to certain embodiments, skewer latching tabs 37a, 37b may secure the cartridge skewer 38 to the magazine holder assembly 34. For example, the skewer latching tabs 37a, 37b may be configured for a press or snap fit with a surface or ridge in the recess 106 of the retention plate 100 to prevent the magazine holder assembly 34 from falling out of the tool 10.

According to the illustrated embodiment, the housing 96 of the magazine holder assembly 34 may include a top wall 108, bottom wall 110, first side wall 112, and second sidewall 114. Referencing FIGS. 19 and 20, an interior portion 115a, 115b of the first and second sidewalls 112, 114, respectively, may each include a track 116a, 116b and a stationary rack 118a, 118b. According to certain embodiments, the stationary track 118a, 118b may be affixed in a stationary position. For example, the non-moving, stationary track 118a, 118b may be part of, or connected to, the first and/or second sidewall 112, 114 the housing 96. For example, according to certain embodiments, the stationary rack 118a, 118b may be molded as part of the housing 96.

The track 116a, 116b may be configured to receive the slideable displacement of at least a portion of a moveable rack 120a, 120b along the track 116a, 116b. According to an illustrated embodiment, an inner side wall 122a, 122b of the stationary rack 118a, 118b and an inner side wall 124a, 124b of the movable rack 120a, 120b include a plurality of teeth or serrations 126. Such teeth 126 are configured to engage with one or more pusher arms 128 of the pusher 39, as shown, for example, in at least FIGS. 11 and 12, as discussed below. According to the illustrated embodiment, the pusher arms 128 may extend away form a pusher body 41 of the pusher 39.

Figure 21:
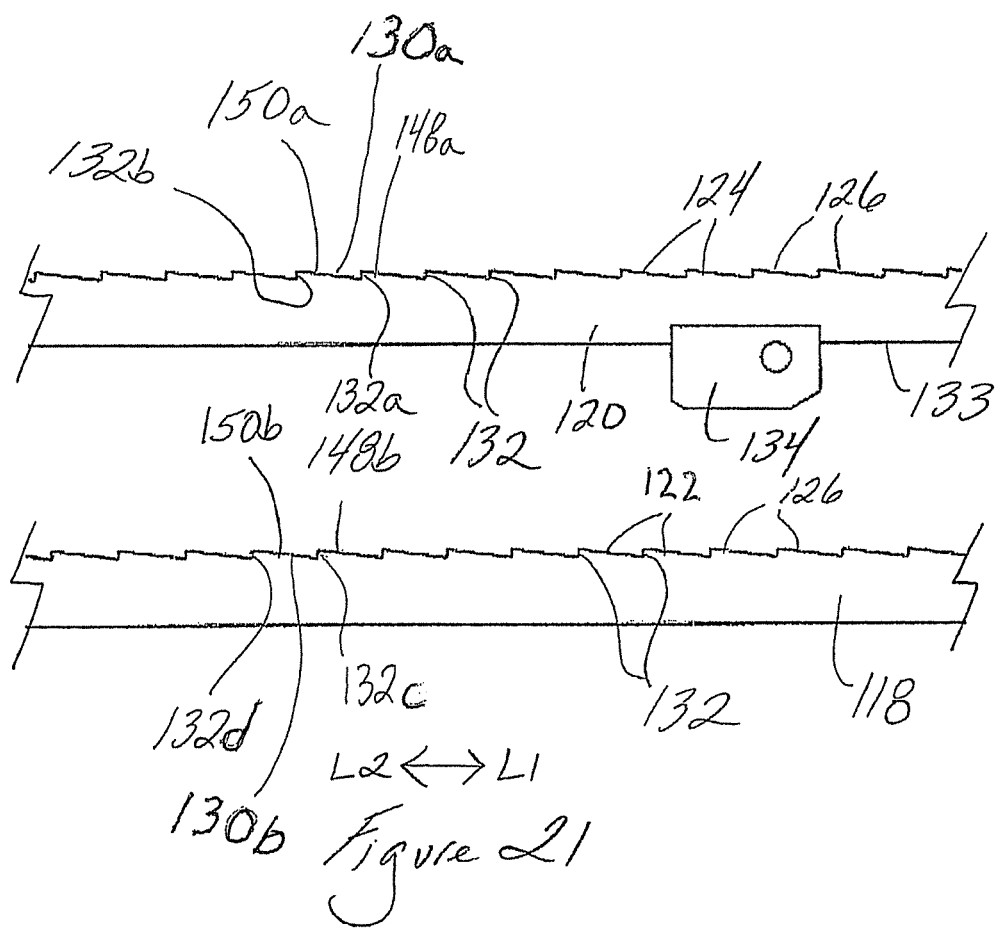
FIG. 21 illustrates a side view of a portion of a movable rack and a stationary rack.
Figure 22:
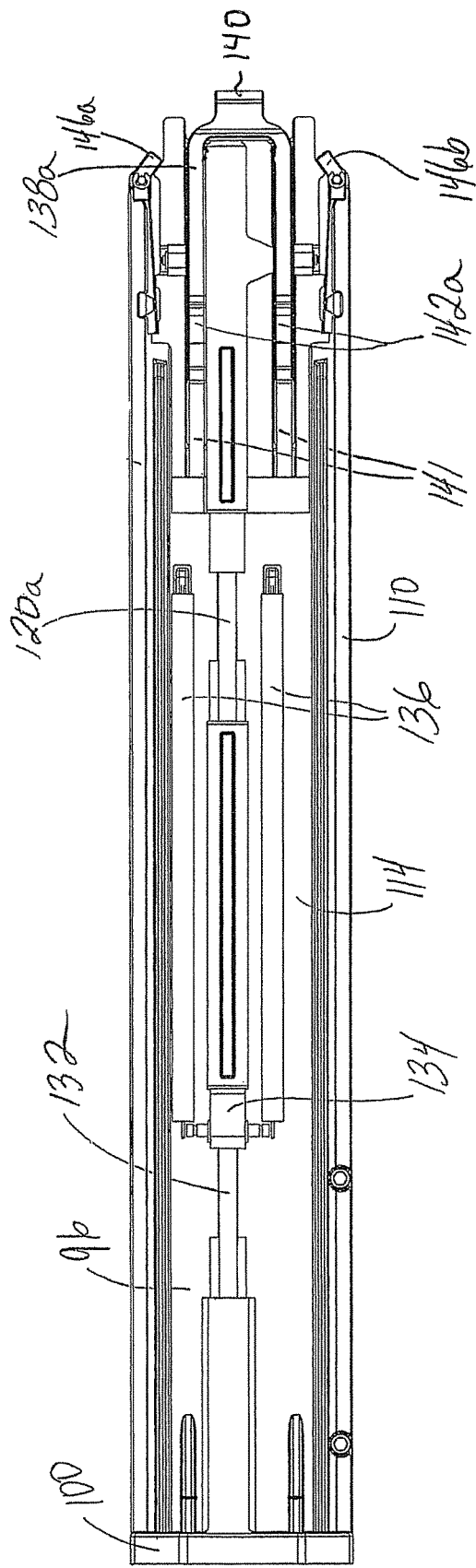
FIG. 22 illustrates a left side view of the magazine holder assembly illustrated in FIG. 18.
Figure 23:
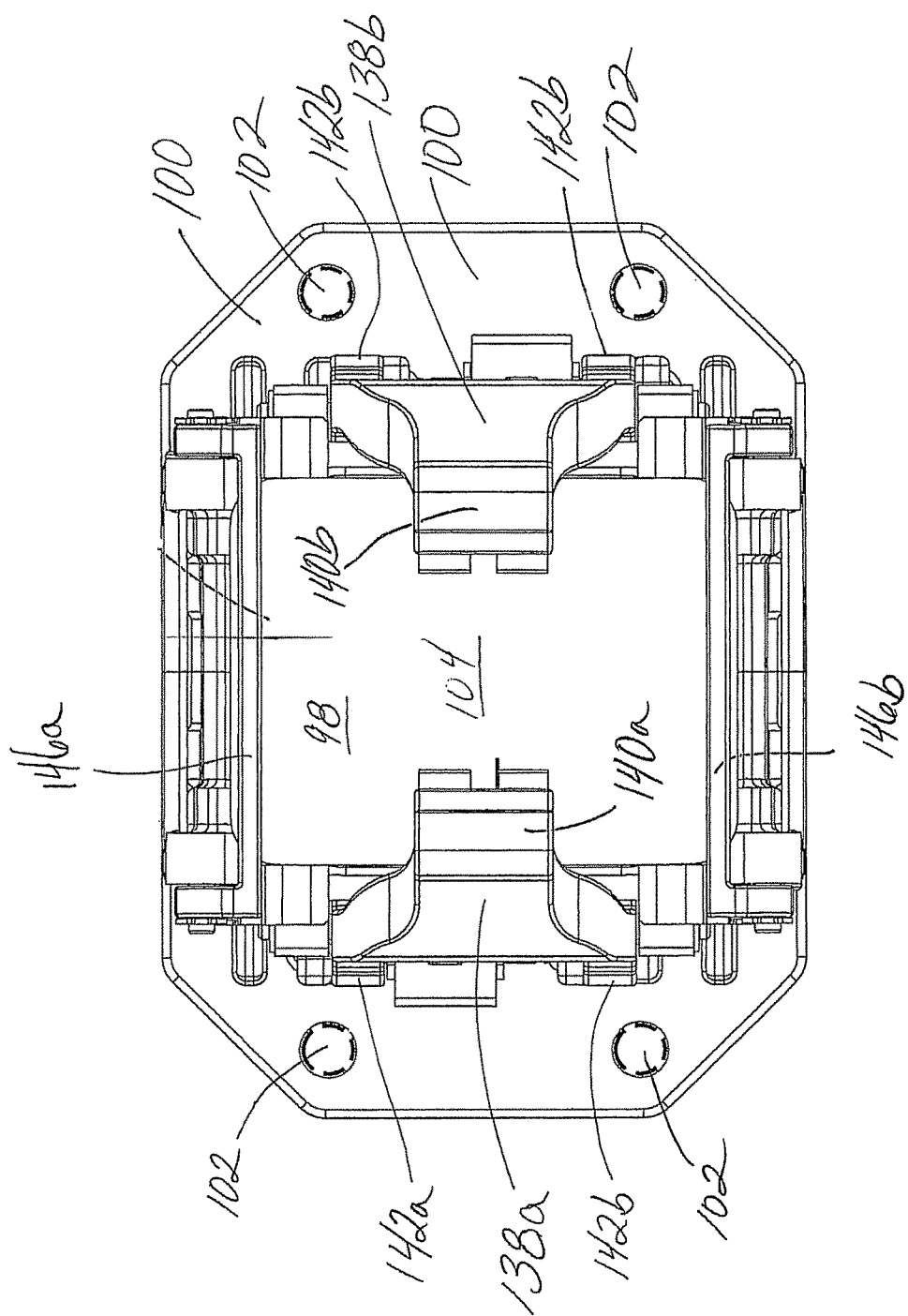
FIG. 23 illustrates a front view of the magazine holder assembly illustrated in FIG. 18.
Figure 24:
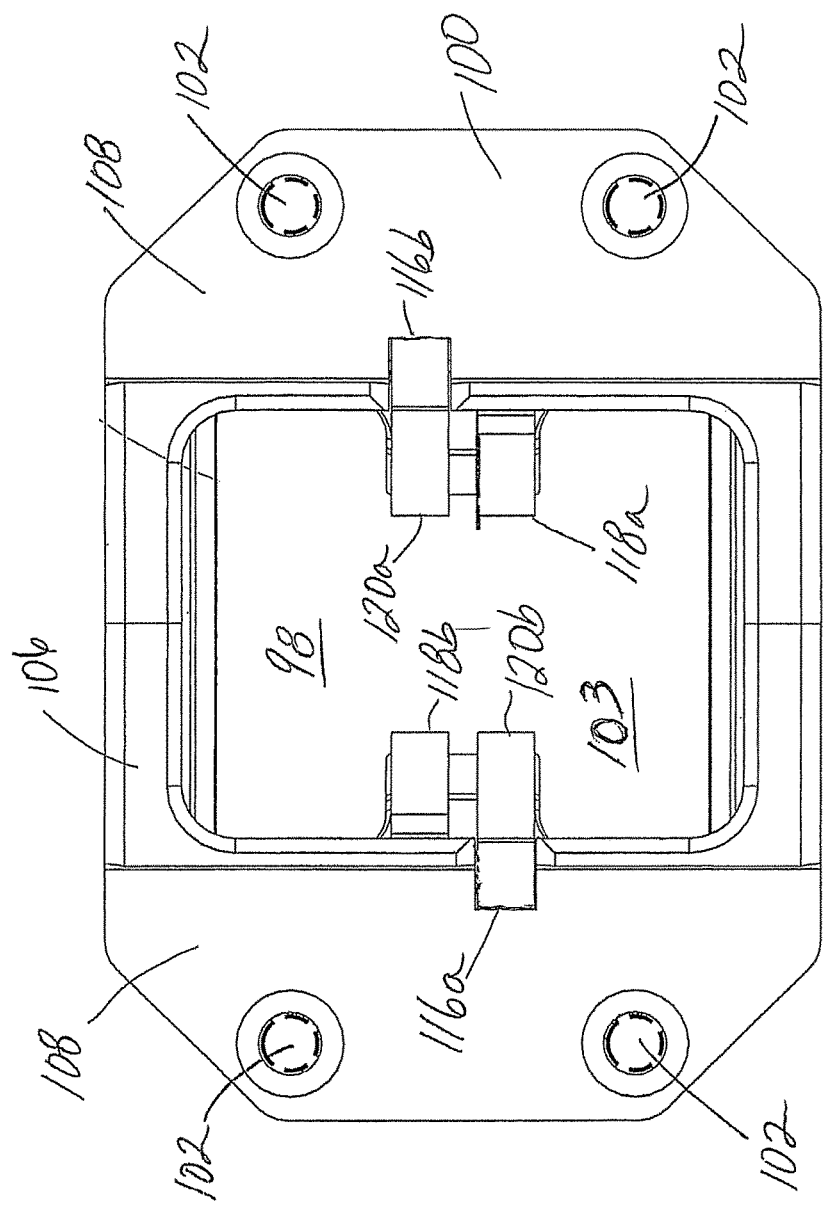
FIG. 24 illustrates a rear view of the magazine holder assembly illustrated in FIG. 18.

The pusher arms 128a-d may be configured to bend and/or deflect to allow the pusher arms 128a-d to engage successive teeth 126 of the racks 118, 120 as the pusher 39 is displaced toward the front opening 104 of the magazine holder assembly 34, as discussed below. FIG. 21 illustrates a side view of a portion of a moveable rack 120 according to an illustrated embodiment. As shown, at least a plurality of the teeth 126 includes an inclined surface 130 that terminates at an abutment surface 132. The abutment surface 132 may extend at generally a 90 degree angle from the inclined surface 130, among other angles. Additionally, an outer side wall 133 of the moveable rack 120 includes a slider tab 134 that is utilized to displace the movable rack 120.

Figure 18:
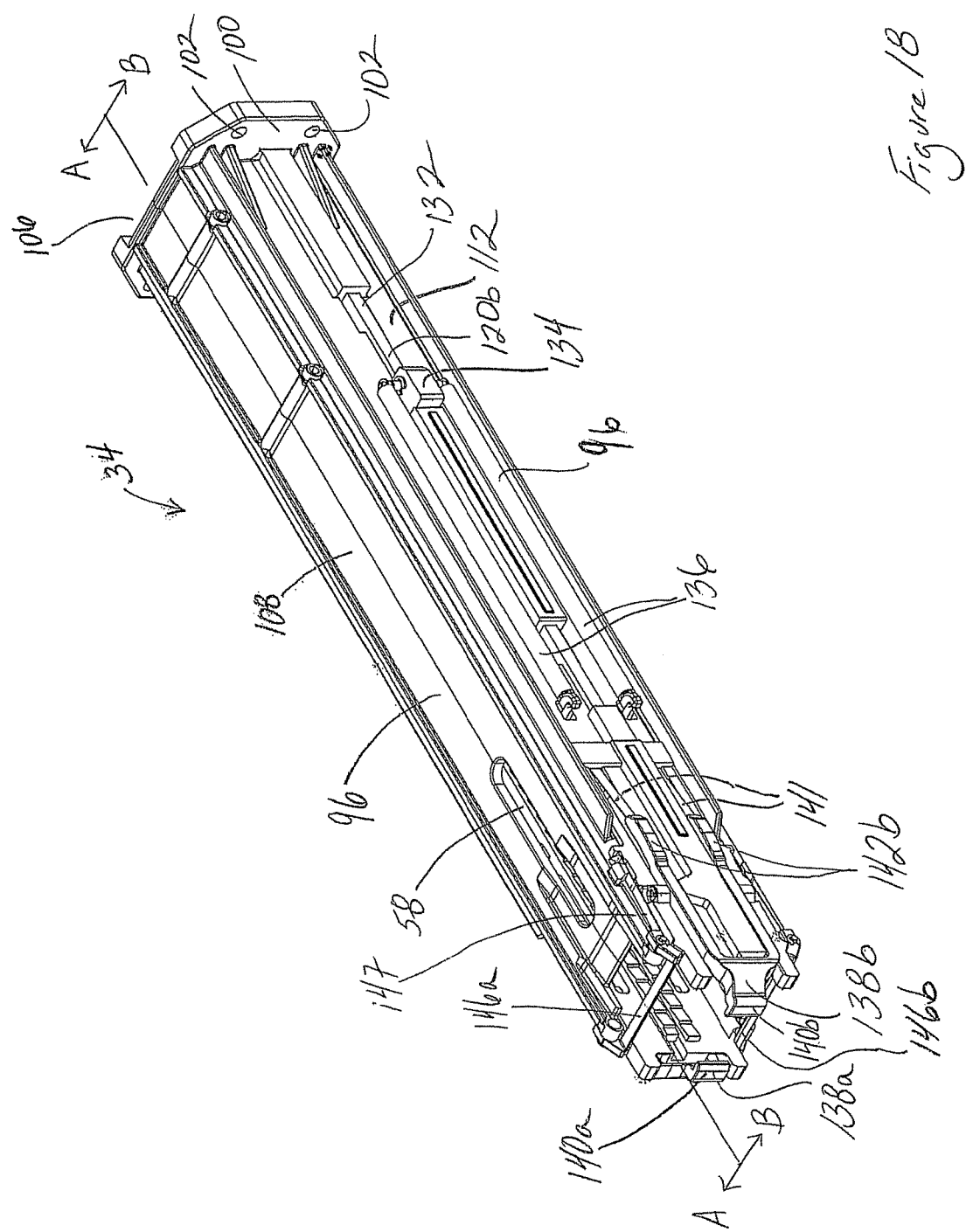
FIG. 18 illustrates a right side perspective view of a magazine holder assembly.
Figure 19:
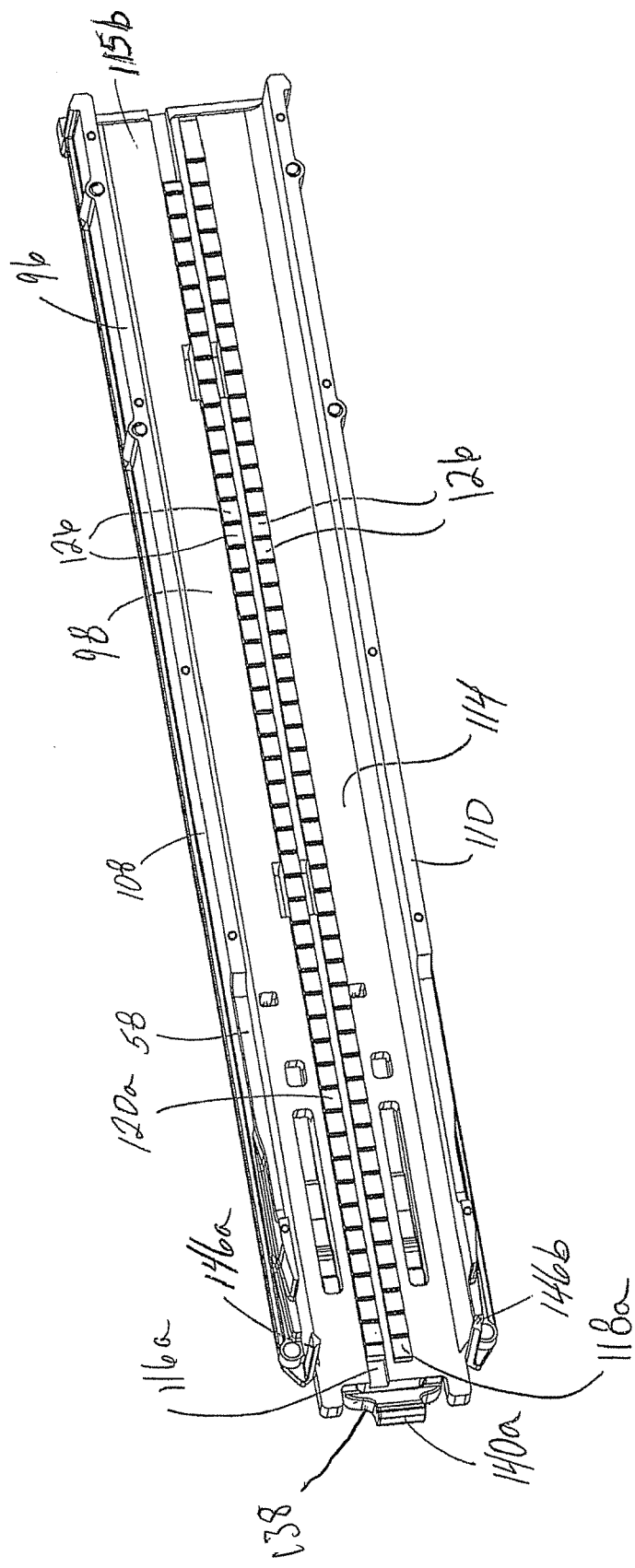
FIG. 19 illustrates a cross sectional view of the magazine holder assembly taken along line A-A of FIG. 18.
Figure 20:
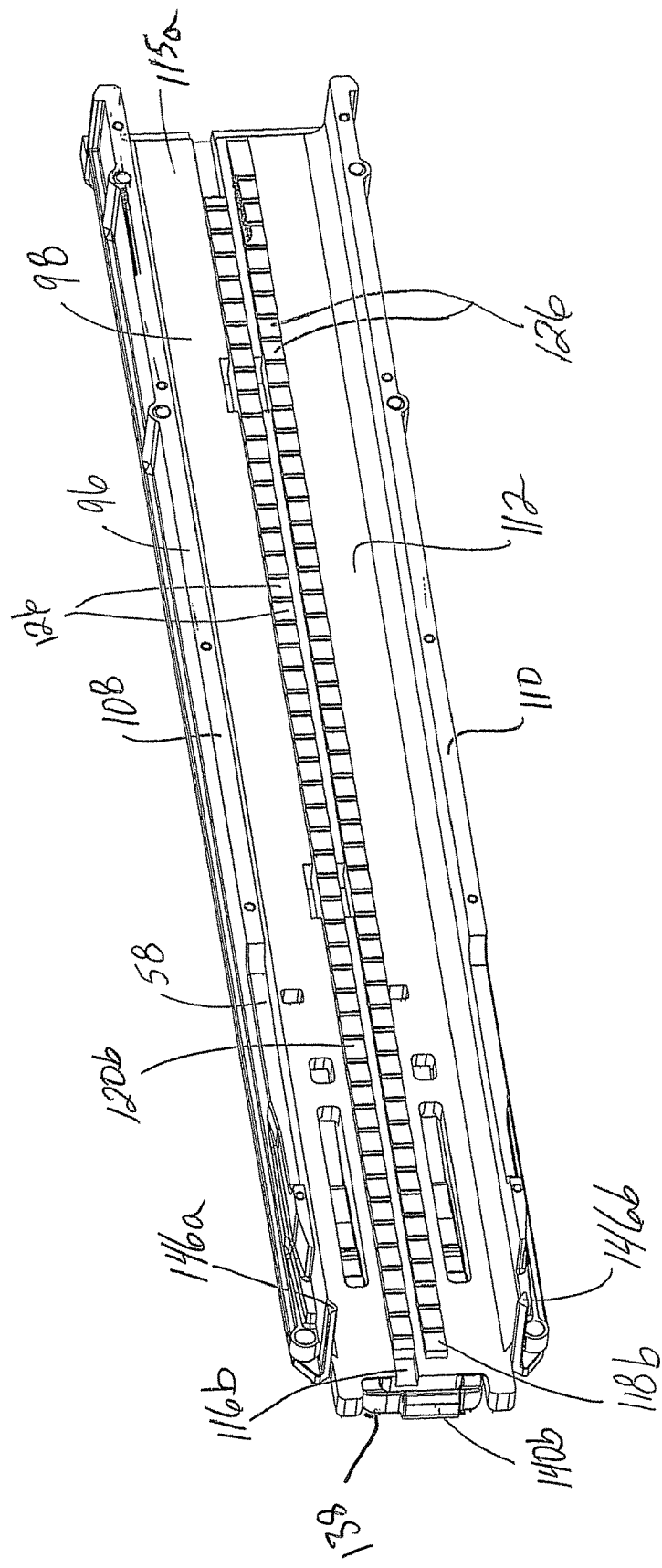
FIG. 20 illustrates a cross sectional view of the magazine holder assembly taken along line B-B of FIG. 18.

Referencing FIGS. 18, 19, and 21, the slider tab 134 of the moveable rack 120 is operably connected to at least one spring 136. For example, in the illustrated embodiment, two springs 136 are connected to each slider tab 134, with the opposing end of the springs 136 connected to the housing 96. The springs 136 are biased to provide a force against the moveable rack 120 that pulls the pusher 39 against the clip stack 84 and towards the proximal end 72 of the cartridge skewer 38.

The magazine holder assembly 34 further includes at least one retention arm 138 that is pivotally connected to the housing 96 of the magazine holder assembly 34. The retention arms 138 may be pivoted between open and closed positions. When in the closed position, at least a portion of the retention arms 138a, 138b, such as, for example, a front portion 140a, 140b, may extend into and/or in front of the front opening 104 so as to provide a barrier that at least assists in preventing the dispensing of weld clips 36 through the front opening 104 and thereby at least assists in retaining weld clips 36 of the clip stack 84 inside the interior area 98 of the magazine holder assembly 34. According to the illustrated embodiment, the retention arms 138a, 138b may be biased in the closed position, such as, for example, through the use of one or more springs 141, such as, for example, a leaf spring, among other biasing mechanisms.

As shown at least in FIG. 18, the retention arms 138a, 138b include an elevated, cam surface 142 that is used in pivoting the retention arms 138a, 138b between the open and closed positions. For example, as shown at least in FIG. 8, the spindle 49 may include or be operably connected to an actuator 144a, 144b that engages the cam surfaces 142a, 142b as the spindle 49 is generally displaced toward the rear portion 15 of the tool 10. As the actuator 144 comes into contact with, and travels along, the cam surface 142a, 142b, the actuator 144 provides enough force to overcome the biasing force of the spring 141 and forces the front portion 140 of the retention arms 138a, 138b to pivot away from the front opening 104 so the retention arms 138a, 138b do not block the dispensing of a weld clip 36 from the interior area 98 of the magazine holder assembly 34.

According to the illustrated embodiment, the magazine holder assembly 34 also includes at least one pawl mechanism 146 that is pivotally connected to the magazine holder assembly 34 and biased in a closed position by one or more springs 147. The pawl mechanism 146 may be configured to control the direction of travel of a weld clip 36 that is being dispensed from magazine holder assembly 34 and/or the clip stack 84. For example, according to certain embodiments, when a weld clip 36 from the clip stack 84 is to be dispensed from the magazine holder assembly 34, that weld clip 36 may be displaced past one or more pawl mechanisms 146 in a direction toward the front portion 13 of the tool 10. As the weld clip 36 passes the pawl mechanism 146 while being engaged by the electrode arms 60a, 60b, the weld clip 36 may engage and/or push upon the pawl mechanism 146 so that the pawl mechanism 146 overcomes the biasing force of a spring 147 and is pivoted from a lowered position to a raised position. Once the weld clip 36 is sufficiently past the pawl mechanism 146, spring 147 of the pawl mechanism 146 returns to a lowered position, and the weld clip 36 is retained in a load position between at least the pawl mechanism 146 and the retention arms 138a, 138b. Further, then in the lowered position, the pawl mechanism 146 may provide an obstacle that prevents the weld clip 36 from retreating back past the pawl mechanism 146 in the general direction of the rear portion 15 of the tool 10 when the electrode arms 60a, 60b move rearward to the load position to grip a weld clip 36. Therefore, the pawl mechanism 146 may prevent the weld clip 36 from rejoining the clip stack 84.

The magazine 86 may be inserted into the magazine holder assembly 34 through the rear opening 103 of the magazine holder assembly 34 until the back wall 68 of the cartridge skewer 38 is properly positioned against and/or along the retention plate 100 and/or the tool 10. The cartridge skewer 38 may be sized such that, when the magazine 86 is positioned in the magazine holder assembly 34, at least a portion of the retention pin 40 is positioned outside of housing 96 of the magazine holder assembly 34, as shown for example, in FIG. 9. Moreover, according to certain embodiments, the retention pin 40 may be configured to extend beyond a front portion 13 of the tool 10, such as, for example, extending beyond the shield assembly 14, as shown in at least FIG. 1. Such extension may permit for the relatively easy removal of the retention pin 40 when the magazine 86 is loaded in a magazine holder assembly 34 that is positioned in the tool 10. Additionally, the retention pin 40 may be positioned such that before and/or upon removal of the retention pin 40, each of the weld clips 36 may be positioned between the retention arms 138a, 138b and the pusher 39.

Additionally, when the magazine 86 is positioned in the magazine holder assembly 34, the pusher arms 128a-d of the pusher 39 each engage one or more teeth 126 on an adjacent stationary rack 118a, 118b. For example, in the illustrated embodiment, a first pusher arm 128a may engage one or more teeth of a movable rack 120a, while a second pusher arm 128b may engage one or more teeth 126 of a stationary rack 118a. Moreover, referencing at least FIGS. 11, 12, and 21, the pusher arms 128a-d may engage the abutment surface 132 of a tooth of an adjacent rack 118, 120. Such engagement, as well as the force provided by spring 136 on the moveable racks 120a, 120b, may allow the pusher 39 to exert a force on the weld clips 36 and/or clip stack 84 that pushes the weld clips 36 and/or clip stack 84 toward the front opening 104 of the magazine holder assembly 34 and/or against the closed retention arms 138a, 138b.

With a magazine 86 and magazine holder assembly 34 in the tool 10, the spindle 49 may be laterally displaced along the interior region 98 such that at least a portion of the spindle 49 and/or a protrusion extending from the spindle 49 engages and/or is positioned to engage the slider tabs 134a, 134b of the moveable racks 120a, 120b. Depending on the embodiment, such displacement of the spindle 49 may occur upon activation of the activator 27 and/or upon a signal from a weld clip sensor 62 indicating the presence of weld clips 36 and/or a magazine 86 in the tool 10. The sensor 62 may be used to provide a variety of different information to the tool 10 and/or auxiliary device, including, for example, the need for more weld clips 36 to be inserted into the tool 10 and/or the need to insert a magazine 86 with weld clips 36 into the magazine holder assembly 34. In various embodiments, additional sensors can be used, for example, to provide additional information to the tool 10 and/or auxiliary device regarding the need to remove a magazine 86 from the magazine holder assembly 34, among other things. As previously discussed, according to certain embodiments, such lateral displacement of the spindle 49 may be achieved through the use of a motor 42 that drives a lead screw 44. The spindle 49 may move the moveable rack 120 to increase the biasing force being exerted against the pusher 39 and/or to index the weld clips 36 one position forward toward the front opening 104 when another weld clip 36 is being moved to a load position.

For example, referencing FIG. 21, according to the illustrated embodiment, prior to being indexed, a first pusher arm 128a may engage an abutment surface 132a of a first tooth 148a of the moveable rack 120, while a second pusher arm 128b may engage an abutment surface 132c of a first tooth 148b of the stationary rack 118. When the weld clips 36 of the clip stack 62 are to be indexed forward (in the direction indicated by L2 in FIG. 21) one position, the spindle 49 may be laterally displaced in a rear direction (indicated by L1 in FIG. 21) so the spindle 49, or a tab operably connected to the spindle 49, pushes the slider tab 134, and thus the moveable rack 120, in the rear direction. As the moveable rack 120 is displaced in the rear direction, the first pusher arm 128a may travel along an inclined surface 130a of a second tooth 150a of the moveable rack 120 while the second pusher arm 128b remains engage with the abutment surface 132c of the first tooth 148b of the stationary rack 118. The motor 42 may be configured or otherwise controlled to continue the displacement of the spindle 49, and thus the moveable rack 120, until the first pusher arm 128a engages the abutment surface 132b of the second tooth 150a of the moveable rack 120. With the first pusher arm 128a in this example engaging the abutment surface 132b of the moveable rack 120, the motor 42 may then reverse direction so that the spindle 49 is displaced in a forward direction (L2). As the spindle 49 moves in the forward direction, the springs 136 that are operably connected to the slider tab 134 may push or pull the slider tab 134, and thus the moveable rack 120, in the forward direction (L2). The movement of the movable rack 120 in the forward position causes the abutment surface 132b of the second tooth 150a of the moveable rack 120 to push the first pusher arm 128a, and thus the pusher 39, forward with the moveable rack 120. As the pusher 39 is moving forward, the second pusher arm 128b travels along the inclined surface 130b of the second tooth 150b of the stationary rack 118 until the second pusher arm 128b engages the abutment surface 132d of the second tooth 150b. According to certain embodiments, the springs 136 may provide sufficient force to displace the second pusher arm 128b, and thus the pusher 39, one tooth of the stationary rack 118 during each indexing of the clip stack 84. Further, the presence of weld clips 36 in the clip stack 84 and the retention arms 138a, 138b may also limit the distance that the pusher 39 may travel during indexing.

While the foregoing example was discussed in the context of a single pair of stationary and moveable racks 118, 120, a variety of combinations of moveable and stationary racks 118, 120 may be employed. For example, at least FIGS. 19, 20, 23, and 24 illustrate a magazine holder assembly 34 having two pairs of moveable and stationary racks 118, 120 on opposing walls 112, 114 of the housing 96. Additionally, as shown in these figures, according to certain embodiments, the position of the moveable racks 120 relative to the corresponding stationary rack 118 in the pair of racks 118, 120 may vary for each pair of racks 118, 120. For example, in one pair of racks 118, 120, the moveable rack 120 may be above the neighboring stationary rack 118, while the other pair of racks 118, 120 may have the moveable rack 120 below the neighboring stationary rack 118. Such differences in the positioning of the stationary and moveable racks 118, 120 between multiple pairs of racks 118, 120 may minimize and/or eliminate potential twisting and/or turning of the pusher 39 associated with forces exerted on the pusher arms 128 by the moveable racks 120.

When a weld clip 36 in the load position is to be used for welding, the spindle 49 is laterally displaced rearward toward the rear portion 15 of the tool 10. As discussed, such rearward movement of the spindle 49 may occur in connection with the rearward movement of the spindle 49 used to engage the slider tab 134 of the moveable rack 120. As the spindle 49 moves rearward, the actuators 144a, 144b on or connected to the spindle 49 may engage and travel along at least a portion of the cam surfaces 142 of the retention arms 138a, 138b. As the actuators 144a, 144b travel along the cam surfaces 142 with the spindle 49 traveling toward the rear portion 15 of the tool 10, the retention arms 138a, 138b are moved from the closed position to the opened position. With the retention arms 138a, 138b in the open position, the retention arms 138a, 138b may no longer obstruct the displacement of the weld clip 36 from the load position.

Additionally, according to embodiments in which the electrode arms 60a, 60b are connected to, and extend away from, the spindle 49. Thus, the electrode arms 60a, 60b may be displaced with the spindle 49. Further, according to the illustrated embodiment, the electrode arms 60a, 60b may have an angled orientation such that distance that the electrode arms 60a, 60b are separated from one another decreases as the distance away from the spindle 49 increases. Thus, as the spindle 49 is displaced toward the rear portion 15 of the tool 10, the distance separating the electrode arms 60a, 60b decreases as the electrode arms 60a, 60b pass weld clip 36 that is in the loaded position until the distance between the electrode arms 60a, 60b is small enough to result in the electrode arms engaging the weld clip 36. Further, the electrode arms 60a, 60b may be displaced a sufficient distance to allow the electrode arms 60a, 60b to provide a clamping force on the weld clip 36. Such a clamping force may allow the weld clip 36 to be subsequently moved with the electrode arms 60a, 60b when the electrode arms are displaced toward the front portion 13 of the tool 10. Additionally, the clip back-up arms 52a, 52b may prevent a weld clip 36 from moving rearward to the expanding opening and no longer being gripped by the electrode arms 60a, 60b.

Such timing of the application of the clamping force on the weld clip 36 by the electrode arms 60a, 60b may be timed to coincide with the opening of the retention arms 138a, 138b caused by engagement of the actuators 144a, 144b with the cam surfaces 142. However, while the retention arms 138a, 138b are opened, the clamping force provided by the electrode arms 60a, 60b on the weld clip 36, and the positioning of that weld clip 36, may prevent other weld clips 36 from being dispensed from the clip stack 84. Further, as the electrode arms 60a, 60b engage the weld clip 36, the pawl mechanism 146 is positioned to prevent that engaged weld clip 36 from being pushed back into the interior region of the magazine holder assembly 34 of the magazine assembly 64.

The spindle 49 and/or magazine holder assembly 34 may also be configured so that, when the electrode arms 60a, 60b has the weld clip 36 that is being dispensed, the spindle 49 has displaced the slider tab 134 a distance sufficient to adjust which abutment surface 132 of the teeth 126 of the moveable rack(s) 120 is engaged with the at least one pusher arm 128. For example, as the spindle moves the electrode arms 60a, 60b to engage a weld clip 36, the displacement of the spindle 49 may also result in the displacement of a moveable rack 120 so that the first pusher arm 128a moves from engaging the abutment surface 132 of the first tooth 148a of the moveable rack 120 to engaging the abutment surface 132 of the second tooth 150a. The spindle 49 and/or magazine holder assembly 34 may therefore be configured such that the electrode arms 60a, 60b generally reach the loaded position when the pusher arm 128a attains an engagement with the abutment surface 132 of the second tooth 150a of the moveable rack 120.

When the weld clip 36 that is being held by the electrode arms 60a, 60b is laterally displaced from a load position to a home position, the spindle 49 may be laterally displaced toward the front portion 13 of the tool 10. As the spindle 49 moves forward, the actuators 144a, 144b may travel back along at least a portion of the cam surfaces 142 of the retention arms 138a, 138b until the actuators 144a, 144b disengage the cam surfaces 142. With the actuators 144a, 144b disengaged from the cam surfaces 142, the retention arms 138a, 138b are moved back from the open position to the closed position. With the retention arms 138a, 138b in the closed position, the retention arms 138a, 138b may again obstruct the dispensing of other weld clips 36 from the clip stack 84.

Additionally, as the spindle 49 moves forward, the weld clips 36 remaining in the clip stack 84 are moved forward, or indexed, one position to take up the space that had been previously occupied by the weld clip 36 that is being moved to the weld position with the electrode arms 60a, 60b. For example, according to certain embodiments, as the spindle 49 moves forward with the removed weld clip 36 being held by the electrode arms 60a, 60b, the portion of the spindle 49 and/or protrusion from the spindle 49 that had been engaging the slider tab 134a, 134b of the movable rack 120a, 120b is also moved forward toward the front portion 13 of the tool 10. With the spindle 49 moving forward, the biasing force of the spring(s) 136 that are attached to the slider tab 134a, 134b may pull the slider tab 134a, 134b, and thus the movable rack 120a, 120b, forward toward the front portion 13 of the tool 10.

Such forward movement of the moveable rack 120a, 120b may be translated into displacement of the pusher 39 in a similar forward direction. Moreover, the abutment surface(s) 132 of the movable rack(s) 120a, 120b that is/are engaged with a pusher arm(s) 128 is/are displaced with the moveable rack(s) 120a, 120b. This displacement of the abutment surface(s) 132 of the moveable rack(s) 120a, 120b results in the pusher arm(s) 128 that is/are engaged with this abutment surface(s) 132 also being displaced. Such displacement of the pusher arm(s) 128 results in the pusher 39 being displaced toward the front portion 13 of the tool 10 with the moveable rack 120a, 120b. Further, as the pusher 39 is displaced, the pusher arm(s) 128 that had been engaging the abutment surface 132 of the stationary rack 118a, 118b also proceed to travel in the same direction as the pusher 39. Thus, as the pusher 39 is displaced, the pusher arm(s) 128 that is/are engaging the stationary rack(s) 118a, 118b travel along the inclined surface 126 of the adjacent, next tooth 126 before reaching, and engaging, the abutment surface 132 of that next tooth 126. According to such an embodiment, the positioning of the weld clips 36 in the magazine 86 are indexed one position forward in the magazine holder assembly 34. However, as discussed above, although the weld clips 36 of the clip stack 84 may be indexed one position forward, the forward movement of the spindle 49 may be configured such that retention arms 138a, 138b are returned to the closed position before the weld clips 36 that remain in the clip stack 84 may exit out of the magazine holder assembly 34, thus preventing the weld clips 36 that are remaining in the clip stack 84 from being discarded from, or falling out of, the magazine holder assembly 34 and thus the tool 10.

In the illustrated embodiment, when in the home position, the weld clip 36 is positioned in the electrode arms 60a, 60b so that the weld clip 36 may be welded to a work piece. The electrode arms 60a, 60b and/or weld clip 36 may then be pressed against the work piece, causing the electrode arms 60a, 60b to be moved rearward compressing spring 47 to the weld position. The activator 27 may be actuated so that a current is provided from the auxiliary device, through the cable 11, and to the spindle 49 and/or electrode arm 60a, 60b to weld the weld clip 36 into the work piece. Further, activation of the activator 27 may activate the motor 42 to allow for adjustments in the welding operation, such as changes in the positioning of the electrode arms 60a, 60b and weld clip 36 and weld duration, as previously discussed.

When the weld clip 36 is secured to the work piece, the spindle 49 and electrode arms 60a, 60b may again be displaced to the load position so as to move the next weld clip 36 in the clip stack 84 to the home position, as previously discussed. Such re-loading of a weld clip 36 may occur in a variety of different manners. For example, according to certain embodiments, when the welding procedure for a weld clip 36 is completed, the auxiliary device may detect the stoppage in the welding procedure, such as the stoppage in the weld arc. The auxiliary device may then deliver a signal that activates the motor 42 that results in the electrode arms being displaced to a load position in which the electrode arms 60a, 60b engage the next weld clip 36 in the clip stack 84 before the electrode arms 60a, 60b return, with the weld clip 36, to the home position. Alternatively, following a welding procedure or when a weld clip 36 is otherwise needed for a welding procedure, the user may again activate the activator 27 to activate the motor 42 so that the electrode arms 60a, 60b proceed with the load sequence and subsequently return to the home position with a weld clip 36.

Figure 25:
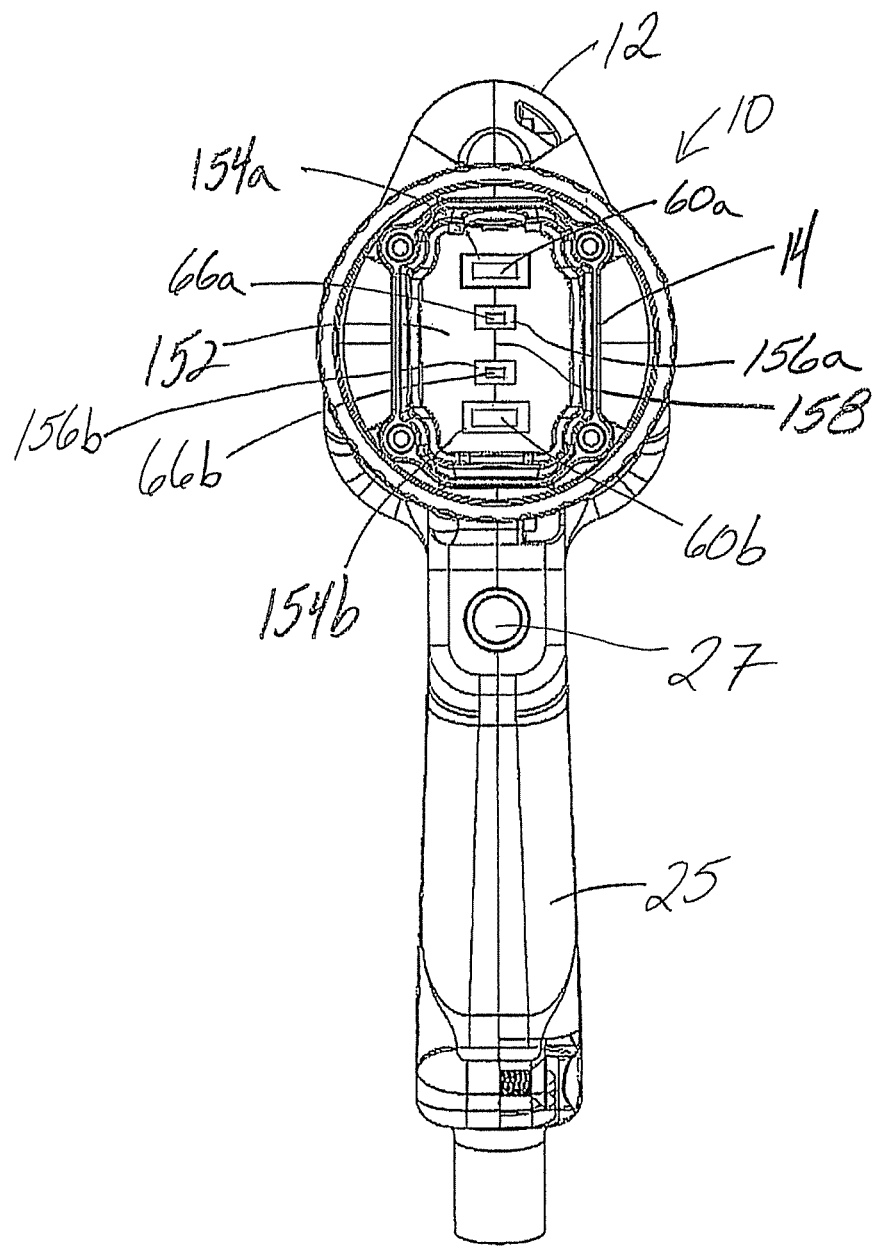
FIG. 25 illustrates a front view of a tool that includes a curtain at a front portion of the tool.

Referencing FIG. 25, according to certain embodiments, the shield assembly 14 may be operably connected to a curtain 152 that is configured to shield and/or protect portions of the interior region 32 of the tool 10 from splatter and other potentially harmful residue generated during the welding operation. The curtain 154 may include a pair of electrode orifices 156a, 156b that are configured to accommodate the movement of at least a portion of the electrode arms 60a, 60b relative to the curtain 152. The curtain 152 may also include skewer orifices 156a, 156b that are configured to receive the arms 66a, 66b of the cartridge skewer 38. Additionally, the curtain 156 may also include a slit 158 that may separate or open when a weld clip 36 from inside the tool 10 passes through the curtain 152, such as, for example, as the weld clip 36 moves to the weld position. Further, the curtain 152 may be relatively resilient such that, upon the weld clip 36 passing through the curtain 152, the curtain returns to a closed orientation as generally shown in FIG. 25, wherein the slit 158 closes.

The invention claimed is:

1. A magazine comprising:
   a cartridge skewer formed by a back wall and at least one arm extending from the back wall to a front end;
   a pusher having at least one opening configured to receive the insertion of the at least one arm of the cartridge skewer; and
   a plurality of weld clips, each of the plurality of weld clips having a base portion and at least one winged portion, the at least one winged portion having a window configured to receive the insertion of the at least one arm of the cartridge skewer, the plurality of weld clips configured to form a clip stack on the cartridge skewer,
   wherein the pusher includes a front surface configured to mate with at least a portion of an adjacent weld clip when the clip stack and pusher are operably positioned on the cartridge skewer, the pusher displaceable from the back wall toward the front end along the at least one arm to exert a force on the clip stack that pushes the clip stack toward the front end.

2. The magazine of claim 1, wherein the pusher includes at least one pusher arm.

3. The magazine of claim 2, wherein the at least one pusher arm comprises four pusher arms.

4. The magazine of claim 1, wherein the back wall includes a skewer latching tab having an orifice, the skewer latching tab configured to assist in the removal of at least the cartridge skewer from a tool.

5. The magazine of claim 1, wherein the magazine includes a retention pin configured for removable engagement with the at least one arm, the retention pin configured to retain the clip stack on the cartridge skewer when the retention pin is secured to the at least one arm of the cartridge skewer.

6. The magazine of claim 5, wherein the at least one arm comprises a first arm and a second arm.

7. The magazine of claim of claim 6, wherein the first and second arms each include an aperture configured to receive the removable insertion of a retention surface of the retention pin, the insertion of the retention surface into the aperture configured to secure the retention pin to the cartridge skewer.

8. The magazine of claim 7, wherein the retention pin includes a first inclined surface and a second inclined surface, the first and second inclined surfaces configured to, when the first inclined surface is engaged with the first arm and the second inclined surface is engaged with the second arm and the retention surface is inserted in the aperture, increase a distance between the first and second arms as the retention pin is rotated to allow for removal of the retention surface from the aperture.

9. The magazine of claim 8, wherein the retention pin further includes at least one ramp surface configured to increase the distance between at least a portion of the first arm and the second arm as the retention pin is slide along a portion of the first and second arms until the retention surface is inserted into the aperture.

10. A magazine comprising:
a cartridge skewer formed by a back wall and a first arm and a second arm extending from the back wall to a front end;
a pusher having a first opening and a second opening, the first opening configured to receive the insertion of the first arm of the cartridge skewer, the second opening configured to receive the insertion of the second arm of the cartridge skewer; and
a plurality of weld clips, each of the plurality of weld clips having a base portion, a first winged portion, and a second winged portion, the first winged portion having a first window configured to receive the insertion of the first arm, the second winged portion having a second window configured to receive the insertion of the second arm, the plurality of weld clips configured to be stacked together to form a clip stack,
wherein the pusher includes a front surface configured to mate with at least a portion of the first winged portion and the second winged portion of an adjacent weld clip when the pusher and clip stack are operably positioned on the cartridge skewer, the pusher displaceable from the back wall toward the front end along the first arm and the second arm to exert a force on the clip stack that pushes the clip stack toward the front end.

11. The magazine of claim 10, wherein the pusher includes at least one pusher arm.

12. The magazine of claim 11, wherein the at least one pusher arm comprises four pusher arms.

13. The magazine of claim 10, wherein the back wall comprises a skewer latching tab, the skewer latching tab configured to assist in the removal of at least the cartridge skewer from a tool.

14. The magazine of claim 10, wherein the magazine further includes a retention pin configured for removable engagement with first and second arms of the cartridge skewer, the retention pin configured to retain the clip stack on the cartridge skewer when the retention pin is secured to one or both of the first arm and the second arm of the cartridge skewer.

15. The magazine of claim of claim 14, wherein the first and second arms each include an aperture configured to receive the removable insertion of a retention surface of the retention pin.

16. The magazine of claim 15, wherein the retention pin includes a first inclined surface and a second inclined surface, the first and second inclined surfaces configured to, when the first inclined surface is engaged with the first arm and the second inclined surface is engaged with the second arm, increase a distance between the first and second arms as the retention pin is rotated.

17. A magazine comprising:
a cartridge skewer having a first arm and a second arm;
a pusher having a pusher body, a first opening, a second opening, and a plurality of pusher arms, the first opening configured to receive the slideable insertion of the first arm of the cartridge skewer, the second opening configured to receive the slideable insertion of the second arm of the cartridge skewer, the plurality of pusher arms configured to protrude from at least a portion of the pusher body;
a plurality of weld clips, each of the plurality of weld clips having a base portion, a first winged portion, and a second winged portion, the first winged portion separated from the base portion by an obtuse angle, the first winged portion having a first window configured to receive the slideable insertion of the first arm, the second winged portion having a second window configured to receive the slideable insertion of the second arm, the plurality of weld clips configured to be stacked together to form a clip stack against the pusher and on the cartridge skewer when the plurality of weld clips and pusher are positioned on the cartridge skewer; and
a retention pin configured to retain the clip stack on the cartridge skewer.

* * * * *